United States Patent
Bhattacharyya et al.

(10) Patent No.: US 8,123,933 B2
(45) Date of Patent: Feb. 28, 2012

(54) PROCESS FOR USING IRON OXIDE AND ALUMINA CATALYST FOR SLURRY HYDROCRACKING

(75) Inventors: Alakananda Bhattacharyya, Des Plaines, IL (US); Beckay J. Mezza, Des Plaines, IL (US)

(73) Assignee: UOP LLC, Des Plaines, IL (US)

(*) Notice: Subject to any disclaimer, the term of this patent is extended or adjusted under 35 U.S.C. 154(b) by 805 days.

(21) Appl. No.: 12/165,184

(22) Filed: Jun. 30, 2008

(65) Prior Publication Data

US 2009/0326303 A1 Dec. 31, 2009

(51) Int. Cl.
*C07C 4/02* (2006.01)

(52) U.S. Cl. ............ 208/217; 208/208 R; 208/244; 208/295; 502/400; 502/406; 502/414; 502/415

(58) Field of Classification Search .......... 208/208 R, 208/244, 295; 502/400, 406, 414–415
See application file for complete search history.

(56) References Cited

U.S. PATENT DOCUMENTS

| | | | |
|---|---|---|---|
| 2,875,150 A | 2/1959 | Schuman | 208/107 |
| 3,183,180 A | 5/1965 | Schuman et al. | |
| 3,728,252 A | 4/1973 | Pitchford | |
| 4,085,068 A | 4/1978 | Gallagher et al. | |
| 4,329,221 A | 5/1982 | Farcasiu et al. | |
| 4,340,466 A | 7/1982 | Inooka | 208/210 |
| 4,381,987 A | 5/1983 | Kuehler | |
| 4,411,766 A | 10/1983 | Garg et al. | |
| 4,452,911 A | 6/1984 | Eccles et al. | 502/100 |
| 4,485,004 A | 11/1984 | Fisher et al. | |
| 4,508,616 A | 4/1985 | Larrauri et al. | 208/111 |
| 4,525,267 A | 6/1985 | Inooka | |
| 4,591,426 A | 5/1986 | Krasuk et al. | 208/96 |
| 4,963,247 A | 10/1990 | Belinko et al. | 208/112 |
| 4,969,988 A | 11/1990 | Jain et al. | 208/108 |
| 5,178,749 A | 1/1993 | Lopez et al. | |
| 5,252,199 A | 10/1993 | Singhal et al. | |
| 5,278,121 A | 1/1994 | Singhal et al. | |
| 5,578,197 A | 11/1996 | Cyr et al. | |
| 5,755,955 A | 5/1998 | Benham et al. | 208/112 |
| 6,045,769 A | 4/2000 | Kambe et al. | |
| 6,059,957 A | 5/2000 | Khan et al. | |
| 6,258,259 B1 | 7/2001 | Kai et al. | |
| 2004/0007498 A1 | 1/2004 | Gislason et al. | |
| 2005/0013759 A1 | 1/2005 | Grow | |

(Continued)

FOREIGN PATENT DOCUMENTS

CA 2314033 7/2000

(Continued)

OTHER PUBLICATIONS

"Asphaltic Bitumen as Colloid System" by J. Pfeiffer et al., Phys. Chem. 44, 139 (1940).

(Continued)

*Primary Examiner* — Walter D Griffin
*Assistant Examiner* — Brian McCaig
(74) *Attorney, Agent, or Firm* — James C Paschall

(57) ABSTRACT

A process and apparatus is disclosed for converting heavy hydrocarbon feed into lighter hydrocarbon products. The heavy hydrocarbon feed is slurried with a catalyst comprising iron oxide and alumina to form a heavy hydrocarbon slurry and hydrocracked to produce lighter hydrocarbons. The iron oxide and alumina catalyst does not require as much iron content relative to non-gaseous material in the reactor to obtain useable products.

19 Claims, 14 Drawing Sheets

U.S. PATENT DOCUMENTS

| | | | |
|---|---|---|---|
| 2005/0098478 | A1 | 5/2005 | Gupta et al. |
| 2007/0203388 | A1 | 8/2007 | Zhao et al. |
| 2007/0207077 | A1 | 9/2007 | Ayyer et al. |
| 2011/0000820 | A1 | 1/2011 | Bhattacharyya et al. |

FOREIGN PATENT DOCUMENTS

| | | |
|---|---|---|
| CA | 2426374 | 4/2003 |
| CA | 2536557 | 2/2006 |
| WO | WO 2006/122275 A2 | 11/2006 |

OTHER PUBLICATIONS

Standard Test Method for Microscopical Analysis by Reflected Light and Determination of Mesophase in a Pitch, ASTM D4616—95 (Reapproved 2005).

U.S. Appl. No. 12/165,158, filed Jun. 30, 2008, Alakananda Bhattacharyya et al.

U.S. Appl. No. 12/165,168, filed Jun. 30, 2008, Beckay J. Mezza et al.

U.S. Appl. No. 12/165,177, filed Jun. 30, 2008, Alakananda Bhattacharyya et al.

U.S. Appl. No. 12/165,192, filed Jun. 30, 2008, Alakananda Bhattacharyya et al.

U.S. Appl. No. 12/165,197, filed Jun. 30, 2008, Alakananda Bhattacharyya et al.

U.S. Appl. No. 12/165,147, filed Jun. 30, 2008, Alakananda Bhattacharyya et al.

U.S. Appl. No. 12/165,137, filed Jun. 30, 2008, Alakananda Bhattacharyya et al.

Ali, "Structure Representation of Asphaltene GPC Fractions Derived from Kuwaiti Residual Oils", Energy & Fuels 2006, 20, 231-238.

Andersen, "X-ray Diffraction of Subfractions of Petroleum Asphaltenes", Energy & Fuels 2005, 19, 2371-2377.

Connolly, "Introduction Quantitative X-Ray Diffraction Methods" for EPS400-001, Introduction to X-Ray Powder Diffraction, Spring 2010, available at http://epswww.unm.edu/xrd/xrdclass/09-Quant-intro.pdf.

Hawley's Condensed Chemical Dictaionary, 14th Ed. (2002), John Wiley & Sons, Inc., definition of "colloidal solution".

Hubbard, "Certification of Si powder diffraction standard reference material 640a", J. Appl. Cryst. (1983), 16, 285-288 (Abstract only).

Innes, "Chapter 6: Catalyst Carriers, Promoters, Accelerators, Poisons, and Inhibitors", Catalysis, vol. I, Fundamental Principles (Part 1), edited by Paul H. Emmett (1954), pp. 246 and 287.

Tanaka, "Characterization of Asphaltene Aggregates Using X-ray Diffraction and Small-Angle X-ray Scattering", Energy & Fuels 2004, 18, 1118-1125.

U.S. Appl. No. 13/218,680, filed Aug. 26, 2011, Bhattacharyya et al.

Alvarez, "Pyrolysis of petroleum residues: analysis of semicokes by X-ray diffraction", Carbon 37 (1999) 1627-1632.

Bara, "Mesophase development during thermal treatment of pitches", Journal of Optoelectronics and Advanced Materials, vol. 10, No. 4, Apr. 2008, pp. 896-899.

Herrick, "Activity and Characterization of Coprocessing Catalysts Produced from an Iron Pentacarbonyl Precursor", Energy & Fuels, 1990, 4, 231-236.

PROCESS FOR USING IRON OXIDE AND ALUMINA CATALYST FOR SLURRY HYDROCRACKING

BACKGROUND OF THE INVENTION

This invention relates to a process and apparatus for the treatment of crude oils and, more particularly, to the hydroconversion of heavy hydrocarbons in the presence of additives and catalysts to provide useable products and further prepare feedstock for further refining.

As the reserves of conventional crude oils decline, heavy oils must be upgraded to meet world demands. In heavy oil upgrading, heavier materials are converted to lighter fractions and most of the sulfur, nitrogen and metals must be removed. Heavy oils include materials such as petroleum crude oil, atmospheric tower bottoms products, vacuum tower bottoms products, heavy cycle oils, shale oils, coal derived liquids, crude oil residuum, topped crude oils and the heavy bituminous oils extracted from oil sands. Of particular interest are the oils extracted from oil sands and which contain wide boiling range materials from naphthas through kerosene, gas oil, pitch, etc., and which contain a large portion of material boiling above 524° C. These heavy hydrocarbon feedstocks may be characterized by low reactivity in visbreaking, high coking tendency, poor susceptibility to hydrocracking and difficulties in distillation. Most residual oil feedstocks which are to be upgraded contain some level of asphaltenes which are typically understood to be heptane insoluble compounds as determined by ASTM D3279 or ASTM D6560. Asphaltenes are high molecular weight compounds containing heteroatoms which impart polarity.

Heavy oils must be upgraded in a primary upgrading unit before it can be further processed into useable products. Primary upgrading units known in the art include, but are not restricted to, coking processes, such as delayed or fluidized coking, and hydrogen addition processes such as ebullated bed or slurry hydrocracking (SHC). As an example, the yield of liquid products, at room temperature, from the coking of some Canadian bitumens is typically about 55 to 60 wt-% with substantial amounts of coke as by-product. On similar feeds, ebullated bed hydrocracking typically produces liquid yields of 50 to 55 wt-%. U.S. Pat. No. 5,755,955 describes a SHC process which has been found to provide liquid yields of 75 to 80 wt-% with much reduced coke formation through the use of additives.

In SHC, a three-phase mixture of heavy liquid oil feed cracks in the presence of gaseous hydrogen over solid catalyst to produce lighter products under pressure at an elevated temperature. Iron sulfate has been disclosed as an SHC catalyst, for example, in U.S. Pat. No. 5,755,955. Iron sulfate monohydrate is typically ground down to smaller size for better dispersion and facilitation of mass transfer. Iron sulfate ($FeSO_4$) usually requires careful thermal treatment in air to remove water from iron sulfate which is typically provided in a hydrated form. Water can inhibit conversion of $FeSO_4$ to iron sulfide and typically must be removed. It is thought that iron sulfate monohydrate decomposes slowly in an SHC to form iron sulfide. Drying the iron sulfate monohydrate in-situ initially dehydrates to $FeSO_4$ as shown in Formula (1). However, $FeSO_4$ also rehydrates to the monohydrate during its decomposition to form iron sulfide in Formula (2). Ultimately, $FeSO_4$ converts to iron sulfide as shown in Formula (3):

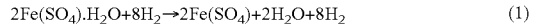
$$2Fe(SO_4).H_2O + 8H_2 \rightarrow 2Fe(SO_4) + 2H_2O + 8H_2 \quad (1)$$

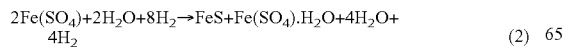
$$2Fe(SO_4) + 2H_2O + 8H_2 \rightarrow FeS + Fe(SO_4).H_2O + 4H_2O + 4H_2 \quad (2)$$

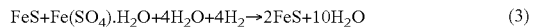
$$FeS + Fe(SO_4).H_2O + 4H_2O + 4H_2 \rightarrow 2FeS + 10H_2O \quad (3)$$

Consequently, the amount of water in the system may limit the rate at which iron sulfide can form. Thermal treatment also removes volatiles such as carbon dioxide to make the catalyst denser and opens up the pores in the catalyst to make it more active.

Iron sulfate already contains sulfur. The thermal treatment converts the iron in iron sulfate to catalytically active iron sulfide. The sulfur from iron sulfate contributes to the sulfur in the product that has to be removed. Other iron containing catalysts such as limonite, which contains $FeO(OH).nH_2O$, require presulfide treatment for better dispersion and conversion of the iron oxide to the active iron sulfide according to CA 2,426,374. Presulfide treatment adds sulfur to the catalyst and consequently to the heavy hydrocarbon being processed. As such, extra sulfur must usually be removed from the product. The active iron in the +2 oxidation state in the iron sulfide catalyst is required to obtain adequate conversion and selectivity to useful liquids and to avoid higher coke formation. U.S. Pat. No. 4,591,426 mentions bauxite without examining it and exemplifies limonite and laterite as catalysts. SHC catalysts are typically ground to a very small particle diameter to facilitate dispersion and promote mass transfer.

During an SHC reaction, it is important to minimize coking. It has been shown by the model of Pfeiffer and Saal, PHYS. CHEM. 44, 139 (1940), that asphaltenes are surrounded by a layer of resins, or polar aromatics which stabilize them in colloidal suspension. In the absence of polar aromatics, or if polar aromatics are diluted by paraffinic molecules or are converted to lighter paraffinic and aromatic materials, these asphaltenes can self-associate, or flocculate to form larger molecules, generate a mesophase and precipitate out of solution to form coke.

Toluene can be used as a solvent to dissolve to separate carbonaceous solids from lighter hydrocarbons in the SHC product. The solids not dissolved by toluene include catalyst and toluene insoluble organic residue (TIOR). TIOR includes coke and mesophase and is heavier and less soluble than asphaltenes which are soluble in heptane. Mesophase formation is a critical reaction constraint in slurry hydrocracking reactions. Mesophase is a semi-crystalline carbonaceous material defined as round, anisotropic particles present in pitch boiling above 524° C. The presence of mesophase can serve as a warning that operating conditions are too severe in an SHC and that coke formation is likely to occur under prevailing conditions.

SUMMARY OF THE INVENTION

We have found that iron oxide and alumina catalysts with 0.1 to 4 wt-% iron content relative to non-gaseous materials in the SHC reactor is more effective at converting heavy oil to more useable compounds than other iron containing bulk available materials. The iron oxide and alumina catalyst was particularly effective at lower concentrations such as below 1.57 wt-% iron relative to catalyst and hydrocarbon in the reactor. Other bulk available minerals that contain iron were not able to perform as well as bauxite at 2 wt-% iron in the reactor without pretreatment with sulfide. At the low concentrations of 1.0 and 1.5 wt-% no catalyst tested performed as well as bauxite. At an iron content of 0.7 wt-% iron, bauxite promoted adequate conversion with sufficiently low production of toluene insoluble organic residue (TIOR). Use of iron oxide and alumina catalyst allows superior conversion of heavy hydrocarbon feed to desirable products with less iron content on catalyst in the reactor with trace or no generation of mesophase which indicates the generation of coke.

BRIEF DESCRIPTION OF THE DRAWINGS

For a better understanding of the invention, reference is made to the accompanying drawings.

DESCRIPTION OF THE PREFERRED EMBODIMENTS

The process and apparatus of this invention is capable of processing a wide range of heavy hydrocarbon feedstocks. It can process aromatic feedstocks, as well as feedstocks which have traditionally been very difficult to hydroprocess, e.g. vacuum bottoms, visbroken vacuum residue, deasphalted bottom materials, off-specification asphalt, sediment from the bottom of oil storage tanks, etc. Suitable feeds include atmospheric residue boiling at about 650° F. (343° C.), heavy vacuum gas oil (VGO) and vacuum residue boiling at about 800° F. (426° C.) and vacuum residue boiling above about 950° F. (510° C.). Throughout this specification, the boiling temperatures are understood to be the atmospheric equivalent boiling point (AEBP) as calculated from the observed boiling temperature and the distillation pressure, for example using the equations furnished in ASTM D1160. Furthermore, the term "pitch" is understood to refer vacuum residue, or material having an AEBP of greater than about 975° F. (524° C.). Feeds of which 90 wt-% boils at a temperature greater than or equal to 572° F. (300° C.) will be suitable. Suitable feeds include an API gravity of no more than 20 degrees, typically no more than 10 degrees and may include feeds with less than 5 degrees.

Figure 1:
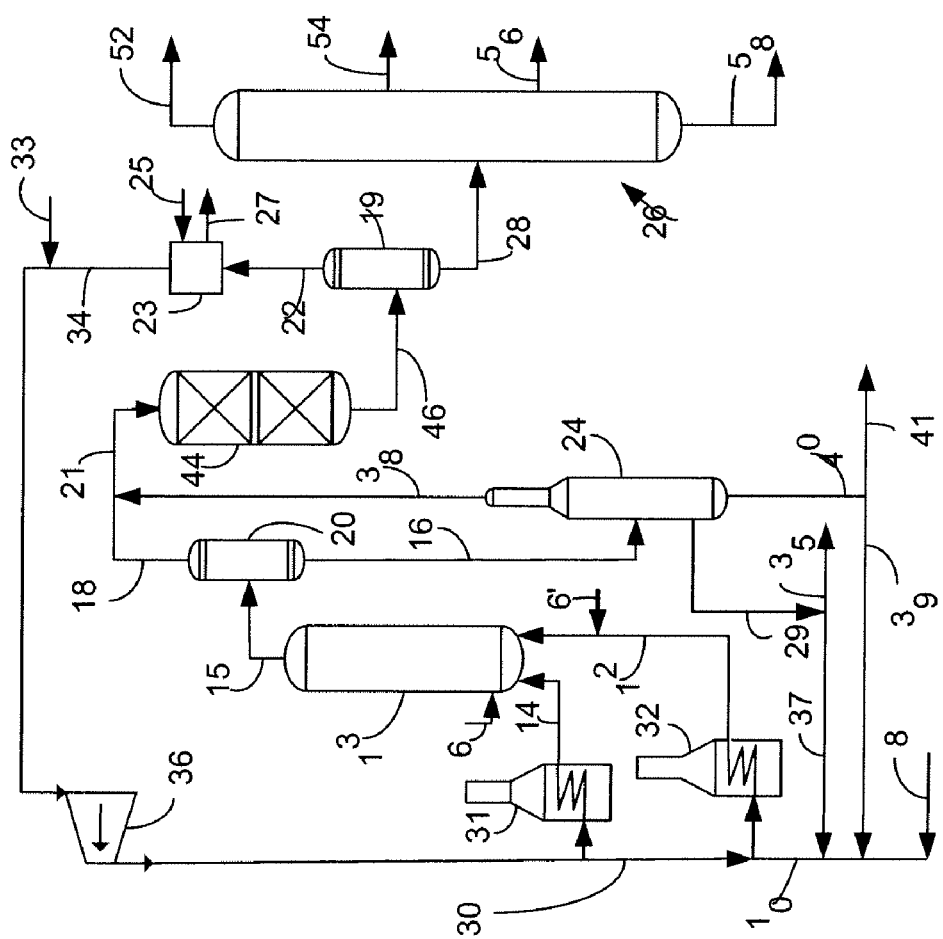
FIG. 1 is a schematic flow scheme for a SHC plant.

In the exemplary SHC process as shown in FIG. 1, one, two or all of a heavy hydrocarbon oil feed in line 8, a recycle pitch stream containing catalyst particles in line 39, and recycled heavy VGO in line 37 may be combined in line 10. The combined feed in line 10 is heated in the heater 32 and pumped through an inlet line 12 into an inlet in the bottom of the tubular SHC reactor 13. Solid particulate catalyst material may be added directly to heavy hydrocarbon oil feed in the SHC reactor 13 from line 6 or may be mixed from line 6' with a heavy hydrocarbon oil feed in line 12 before entering the reactor 13 to form a slurry in the reactor 13. It is not necessary and may be disadvantageous to add the catalyst upstream of the heater 32. It is possible that in the heater, iron particles may sinter or agglomerate to make larger iron particles, which is to be avoided. Many mixing and pumping arrangements may be suitable. It is also contemplated that feed streams may be added separately to the SHC reactor 13. Recycled hydrogen and make up hydrogen from line 30 are fed into the SHC reactor 13 through line 14 after undergoing heating in heater 31. The hydrogen in line 14 that is not premixed with feed may be added at a location above the feed entry in line 12. Both feed from line 12 and hydrogen in line 14 may be distributed in the SHC reactor 13 with an appropriate distributor. Additionally, hydrogen may be added to the feed in line 10 before it is heated in heater 32 and delivered to the SHC reactor in line 12. Preferably the recycled pitch stream in line 39 makes up in the range of about 5 to 15 wt-% of the feedstock to the SHC reactor 13, while the heavy VGO in line 37 makes up in the range of 5 to 50 wt-% of the feedstock, depending upon the quality of the feedstock and the once-through conversion level. The feed entering the SHC reactor 13 comprises three phases, solid catalyst particles, liquid and solid hydrocarbon feed and gaseous hydrogen and vaporized hydrocarbon.

The process of this invention can be operated at quite moderate pressure, in the range of 500 to 3500 psi (3.5 to 24 MPa) and preferably in the range of 1500 to 2500 psi (10.3 to 17.2 MPa), without coke formation in the SHC reactor 13. The reactor temperature is typically in the range of about 400 to about 500° C. with a temperature of about 440 to about 465° C. being suitable and a range of 445 to 460° C. being preferred. The LHSV is typically below about 4 $h^{-1}$ on a fresh feed basis, with a range of about 0.1 to 3 $h^{-1}$ being preferred and a range of about 0.3 to 1 $h^{-1}$ being particularly preferred. Although SHC can be carried out in a variety of known reactors of either up or downflow, it is particularly well suited to a tubular reactor through which feed, catalyst and gas move upwardly. Hence, the outlet from SHC reactor 13 is above the inlet. Although only one is shown in the FIG. 1, one or more SHC reactors 13 may be utilized in parallel or in series. Because the liquid feed is converted to vaporous product, foaming tends to occur in the SHC reactor 13. An antifoaming agent may also be added to the SHC reactor 13, preferably to the top thereof, to reduce the tendency to generate foam. Suitable antifoaming agents include silicones as disclosed in U.S. Pat. No. 4,969,988.

A gas-liquid mixture is withdrawn from the top of the SHC reactor 13 through line 15 and separated preferably in a hot, high-pressure separator 20 kept at a separation temperature between about 200 and 470° C. (392 and 878° F.) and preferably at about the pressure of the SHC reactor. In the hot separator 20, the effluent from the SHC reactor 13 is separated into a gaseous stream 18 and a liquid stream 16. The liquid stream 16 contains heavy VGO. The gaseous stream 18 comprises between about 35 and 80 vol-% of the hydrocarbon product from the SHC reactor 13 and is further processed to recover hydrocarbons and hydrogen for recycle.

A liquid portion of the product from the hot separator 20 may be used to form the recycle stream to the SHC reactor 13 after separation which may occur in a liquid vacuum fractionation column 24. Line 16 introduces the liquid fraction from the hot high pressure separator 20 preferably to a vacuum distillation column 24 maintained at a pressure between about 0.25 and 1.5 psi (1.7 and 10.0 kPa) and at a vacuum distillation temperature resulting in an atmospheric equivalent cut point between light VGO and heavy VGO of between about 250° and 500° C. (482° and 932° F.). Three fractions may be separated in the liquid fractionation column: an overhead fraction of light VGO in an overhead line 38 which may be further processed, a heavy VGO stream from a side cut in line 29 and a pitch stream obtained in a bottoms line 40 which typically boils above 450° C. At least a portion of this pitch stream may be recycled back in line 39 to form part of the feed slurry to the SHC reactor 13. Remaining catalyst particles from SHC reactor 13 will be present in the pitch stream and may be conveniently recycled back to the SHC reactor 13. Any remaining portion of the pitch stream is recovered in line 41. During the SHC reaction, it is important to minimize coking. Adding a lower polarity aromatic oil to the feedstock reduces coke production. The polar aromatic material may come from a wide variety of sources. A portion of the heavy VGO in line 29 may be recycled by line 37 for form part of the feed slurry to the SHC reactor 13. The remaining portion of the heavy VGO may be recovered in line 35.

The gaseous stream in line 18 typically contains lower concentrations of aromatic components than the liquid fraction in line 16 and may be in need of further refining. The gaseous stream in line 18 may be passed to a catalytic hydrotreating reactor 44 having a bed charged with hydrotreating catalyst. If necessary, additional hydrogen may be added to the stream in line 18. Suitable hydrotreating catalysts for use in the present invention are any known conventional hydrotreating catalysts and include those which are comprised of at least one Group VIII metal and at least one Group VI metal on a high surface area support material, such as a refractory oxide. The gaseous stream is contacted with the hydrotreating catalyst at a temperature between about 200° and 600° C. (4300 and 1112° F.) in the presence of hydrogen at a pressure between about 5.4 and 34.5 MPa (800 and 5000 psia). The hydrotreated product from the hydrotreating reactor 44 may be withdrawn through line 46.

The effluent from the hydrotreating reactor 44 in line 46 may be delivered to a cool high pressure separator 19. Within the cool separator 19, the product is separated into a gaseous stream rich in hydrogen which is drawn off through the overhead in line 22 and a liquid hydrocarbon product which is drawn off the bottom through line 28. The hydrogen-rich stream 22 may be passed through a packed scrubbing tower 23 where it is scrubbed by means of a scrubbing liquid in line 25 to remove hydrogen sulfide and ammonia. The spent scrubbing liquid in line 27 may be regenerated and recycled and is usually an amine. The scrubbed hydrogen-rich stream emerges from the scrubber via line 34 and is combined with fresh make-up hydrogen added through line 33 and recycled through a recycle gas compressor 36 and line 30 back to reactor 13. The bottoms line 28 may carry liquid hydrotreated product to a product fractionator 26.

The product fractionator 26 may comprise one or several vessels although it is shown only as one in FIG. 1. The product fractionator produces a $C_4^-$ recovered in overhead line 52, a naphtha product stream in line 54, a diesel stream in line 56 and a light VGO stream in bottoms line 58.

We have discovered that catalyst particles comprising between about 2 and about 45 wt-% iron oxide and between about 20 and about 90 wt-% alumina make excellent SHC catalysts. Iron-containing bauxite is a preferred bulk available mineral having these proportions. Bauxite typically has about 10 to about 40 wt-% iron oxide, $Fe_2O_3$, and about 54 to about 84 wt-% alumina and may have about 10 to about 35 wt-% iron oxide and about 55 to about 80 wt-% alumina. Bauxite also may comprise silica, SiO2, and titania, TiO2, in aggregate amounts of usually no more than 10 wt-% and typically in aggregate amounts of no more than 6 wt-%. Iron is present in bauxite as iron oxide and aluminum is present in bauxite as alumina. Volatiles such as water and carbon dioxide are also present in bulk available minerals, but the foregoing weight proportions exclude the volatiles. Iron oxide is also present in bauxite in a hydrated form, $Fe_2O_3 \cdot nH_2O$. Again, the foregoing proportions exclude the water in the hydrated composition.

Bauxite can be mined and ground to particles having a mean particle diameter of 0.1 to 5 microns. The particle diameter is the length of the largest orthogonal axis through the particle. We have found that alumina and iron oxide catalysts with mean particle diameters of no less than 200 microns, using the dry method to determine particle diameter, exhibit performance comparable to the performance of the same catalyst ground down to the 0.1 to 5 micron range. Hence, alumina and iron oxide catalysts with mean particle diameters of no less than 200 microns, suitably no less than 249 microns and preferably no less than 250 microns can be use to promote SHC reactions. In an embodiment the catalyst should not exceed about 600 microns and preferably will not exceed about 554 microns in terms of mean particle diameter using the dry method to determine particle diameter. Mean particle diameter is the average particle diameter of all the catalyst particles fed to the reactor which may be determined by a representative sampling. Consequently, less effort must be expended to grind the catalyst particles to smaller diameters for promoting SHC, substantially reducing time and expense. Particle size determinations were made using a dry method which more closely replicates how the bulk catalyst will initially encounter hydrocarbon feed. A wet method for determining particle diameters appeared to break particles of bauxite into smaller particles which may indicate what occurs upon introduction of catalyst into an SHC reactor.

The alumina in the catalyst can be in several forms including alpha, gamma, theta, boehmite, pseudo-boehmite, gibbsite, diaspore, bayerite, nordstrandite and corundum. Alumina can be provided in the catalyst by derivatives such as spinels and perovskites. Suitable bauxite is available from Saint-Gobain Norpro in Stow, Ohio who may provide it air dried and ground, but these treatments may not be necessary for suitable performance as a catalyst for SHC.

We have found that these alumina and iron oxide containing catalyst particles are more effective if they are not first subjected to a thermal treatment or a sulfide treatment. We have also found that water does not impede formation of active iron sulfide from iron oxide in bauxite, so it is not required to remove water by the thermal or any other drying treatment. The water on the catalyst can be either chemically bound to the iron oxide, alumina or other components of the catalyst or be physically bound to the catalyst. More than 23 wt-% water can be present on the catalyst without affecting the performance of the catalyst. We have found that about 39 wt-% water does not affect performance of the catalyst and would expect up to at least about 40 wt-% water on the catalyst would not affect performance. Water on catalyst can be determined by loss on ignition (LOI), which involves heating the catalyst to elevated temperature such as 900° C. All volatiles come off in addition to water but the non-water volatiles were not significant.

The iron in iron oxide in the presence of alumina such as in bauxite quickly converts to active iron sulfide without the need for presenting excess sulfur to the catalyst in the presence of heavy hydrocarbon feed and hydrogen at high temperature as required for other SHC catalysts before addition to the reaction zone. The iron sulfide has several molecular forms, so is generally represented by the formula, $Fe_xS$, where x is between 0.7 and 1.3. We have found that essentially all of the iron oxide converts to iron sulfide upon heating the mixture of hydrocarbon and catalyst to 410° C. in the presence of hydrogen and sulfur. In this context, "essentially all" means no peak for iron oxide is generated on an XRD plot of intensity vs. two theta degrees at 33.1 two theta degrees or no less than 99 wt-% conversion to iron sulfide. Sulfur may be present in the hydrocarbon feed as organic sulfur compounds.

Consequently, the iron in the catalyst may be added to the heavy hydrocarbon feed in the +3 oxidation state, preferably as $Fe_2O_3$ The catalyst may be added to the feed in the reaction zone or prior to entry into the reaction zone without pretreatment. After mixing the iron oxide and alumina catalyst with the heavy hydrocarbon feed which comprises organic sulfur compounds and heating the mixture to reaction temperature, organic sulfur compounds in the feed convert to hydrogen sulfide and sulfur-free hydrocarbons. The iron in the +3 oxidation state in the catalyst quickly reacts at reaction temperature with hydrogen sulfide produced in the reaction zone by the reaction of organic sulfur and hydrogen. The reaction of iron oxide and hydrogen sulfide produce iron sulfide which is the active form of the catalyst. Iron is then present in the +2 oxidation state in the reactor. The efficiency of conversion of iron oxide to iron sulfide enables operation without adding sulfur to the feed if sufficient available sulfur is present in the feed to ensure complete conversion to iron sulfide. Otherwise, sulfur may be added for low sulfur feeds if necessary to convert all the iron oxide to iron sulfide. Because the iron oxide and alumina catalyst is so efficient in converting iron oxide to iron sulfide and in promoting the SHC reaction, less iron must be added to the SHC reactor. Consequently, less sulfur is required to convert the iron oxide to iron sulfide minimizing the need for sulfur addition. The iron oxide and alumina catalyst does not have to be subjected to elevated temperature in the presence of hydrogen to obtain conversion to iron sulfide. Conversion occurs at below SHC reaction temperature. By avoiding thermal and sulfiding pretreatments, process simplification and material cost reduction are achieved. Additionally, less hydrogen is required and less hydrogen sulfide and other sulfur must be removed from the SHC product.

Several terms are noteworthy in the characterization of performance of the iron oxide and alumina catalysts in SHC. "Iron content" is the weight ratio of iron on the catalyst relative to the non-gas materials in the SHC reactor. The non-gas materials in the reactor are typically the hydrocarbon liquids and solids and the catalyst and do not include reactor and ancillary equipment. "Aluminum content" is the weight ratio of aluminum relative to the non-gas materials in the in the SHC reactor. "Pitch conversion" is the weight ratio of material boiling at or below 524° C. in the product relative to the material boiling above 524° C. in the feed. "$C_5$-524° C. yield" is the weight ratio of material in the product boiling in the $C_5$ boiling range to 524° C. relative to the total hydrocarbon feed. "TIOR" is the toluene-insoluble organic residue which represents non-catalytic solids in the product part boiling over 524° C. "Mesophase" is a component of TIOR that signifies the existence of coke, another component of TIOR. "API gravity index" is a parameter that represents the flowability of the material. Mean particle or crystallite diameter is understood to mean the same as the average particle or crystallite diameter and includes all of the particles or crystallites in the sample, respectively.

Iron content of catalyst in an SHC reactor is typically about 0.1 to about 4.0 wt-% and usually no more than 2.0 wt-% of the catalyst and liquid in the SHC. Because the iron in the presence of alumina, such as in bauxite, is very effective in quickly producing iron sulfide crystallites from the sulfur in the hydrocarbon feed, less iron on the iron oxide and alumina catalyst is necessary to promote adequate conversion of heavy hydrocarbon feed in the SHC reactor. The iron content of catalyst in the reactor may be effective at concentrations below or at about 1.57 wt-%, suitably no more than about 1 wt-%, and preferably no more than about 0.7 wt-% relative to the non-gas material in the reactor. In an embodiment, the iron content of catalyst in the reactor should be at least about 0.4 wt-%. Other bulk available minerals that contain iron were not able to perform as well as iron oxide and alumina catalyst in the form of bauxite in terms of pitch conversion, $C_5$-524° C. yield, TIOR yield and mesophase yield. At 2 wt-% iron, limonite was comparable to bauxite only after being subjected to extensive pretreatment with sulfide, after which the limonite produced too much mesophase yield. At the low concentration of 0.7 wt-% iron on the catalyst in the reactor, no catalyst tested performed as well as iron oxide and alumina catalyst while suppressing TIOR and mesophase yield. At around 1 and 1.5 wt-% iron content in the reactor, bauxite performed better than iron sulfate monohydrate and limonite. We have further found that the resulting product catalyzed by the iron oxide and alumina catalyst can achieve an API gravity of at least four times that of the feed, as much as six times that of the feed and over 24 times that of the feed indicating excellent conversion of heavy hydrocarbons. Use of iron oxide an alumina catalyst like bauxite allows superior conversion of heavy hydrocarbon feed to desirable products with less catalyst and trace or no generation of mesophase which signifies coke generation.

The presence of alumina on the iron containing catalyst has a beneficial effect on performance. Alumina combined with other iron containing catalyst improves performance in a SHC reaction, particularly in the suppression of mesophase production. Naturally occurring bauxite has better performance than other iron and aluminum containing catalysts. A suitable aluminum content on the catalyst is about 0.1 to about 20 wt-% relative to non-gas solids in the reactor. An aluminum content of no more than 10 wt-% may be preferred.

The crystallites of iron sulfide generated by bauxite in the reactor at reaction conditions have diameters across the crystallite in the in the nanometer range. An iron sulfide crystal is a solid in which the constituent iron sulfide molecules are packed in a regularly ordered, repeating pattern extending in all three spatial dimensions. An iron sulfide crystalliteis a domain of solid-state matter that has the same structure as a single iron sulfide crystal. Nanometer-sized iron sulfide crystallites disperse well over the catalyst and disperse well in the reaction liquid. The iron sulfide crystallites are typically about the same size as the iron sulfide precursor crystallites from which they are produced. In bauxite, the iron sulfide precursor crystallite is iron oxide. By not thermally treating the bauxite, iron oxide crystals do not sinter together and become larger. Consequently, the catalytically active iron sulfide crystallites produced from the iron oxide remain in the nanometer range. The iron sulfide crystallites may have an average largest diameter between about 1 and about 150 nm, typically no more than about 100 nm, suitably no more than about 75 nm, preferably no more than about 50 nm, more preferably no more than about 40 nm as determined by electron microscopy. The iron sulfide crystallites suitably have a mean crystallite diameter of no less than about 5 nm, preferably no less than about 10 nm and most preferably no less than about 15 nm as determined by electron microscopy. Electron microscopy reveals that the iron sulfide crystallites are fairly uniform in diameter, well dispersed and predominantly present as single crystals. Use of XRD to determine iron sulfide crystallite size yields smaller crystallite sizes which is perhaps due to varying iron to sulfur atomic ratios present in the iron sulfide providing peaks near the same two theta degrees. XRD reveals iron sulfide crystallite mean diameters of between about 1 and about 25 nm, preferably between about 5 and about 15 nm and most preferably between about 9 and about 12 nm. Upon conversion of the iron oxide to iron sulfide, for example, in the reactor, a composition of matter comprising about 2 to about 45 wt-% iron sulfide and about 20 to about 98 wt-% alumina is generated and dispersed in the heavy hydrocarbon medium to provide a slurry. The composition of matter has iron sulfide crystallites in the nanometer range as just described. We have found that the iron oxide precursor crystallites in bauxite have about the same particle diameter as the iron sulfide crystallites formed from reaction with sulfur. We have further found that the alumina and iron oxide catalyst can be recycled to the SHC reactor at least twice without iron sulfide crystallites becoming larger.

Cross polarized light microscopy (PLM) may be used to identify the mesophase structure and quantify mesophase concentration in TIOR from SHC reactions using ASTM D 4616-95. The semi-crystalline nature of mesophase makes it optically active under cross polarized light. TIOR samples are collected, embedded in epoxy and polished. The relative amounts of mesophase can be quantified using PLM to generate an image from the sample and identifying and counting mesophase in the PLM image.

We have also found that this semi-crystalline nature of mesophase also allows it to appear in an XRD pattern. We have found that the presence of mesophase is indicated by a peak at 26 two theta degrees, within ±0.3° and preferably within ±0.2° in an XRD pattern. This mesophase peak found in XRD images correlates with the mesophase found by PLM. We have found the broad feature in the range between about 20 and 29.5 two theta degrees can be associated with mesophase.

To analyze a sample for mesophase, a sample of hydrocarbon material is blended with a solvent such as toluene, centrifuged and the liquid phase decanted. These steps can be repeated. The solids may then be dried in a vacuum oven such as at 90° C. for 2 hours. At this point the dried sample is ready for mesophase identification either by PLM or by XRD. For XRD, a standard such as silicon is worked into the solids sample along with a solvent such as acetone to form a slurry to enable mixing the standard with the sample. The solvent should quickly evaporate leaving the sample with a predetermined concentration of standard. Approximately 1 gram of sample with standard is spread onto a XRD sample holder and placed into the XRD instrument such as a Scintag XDS-2000 XRD instrument and scanned using predetermined range parameters. Scan range parameters such as 2.0/70.0/0.02/0.6 (sec) and 2.0/70.0/0.04/10 (sec) are suitable. Other parameters may be suitable. The resulting data is plotted, for example, by using JADE software from Materials Data, Inc. in Livermore, Calif., which may be loaded on the XRD instrument. The JADE software uses International Center for Diffraction Data (ICDD) as a database of standards for phase identification and automated search-match functions.

To calculate the mesophase concentration, the aggregate area of the peaks in the total carbon region from 20° 2-theta degrees to the right most edge of a silicon peak at 28.5° two theta degrees should be calculated. The right most edge of the silicon peak is at about 29.5 two theta degrees. If a standard other than silicon is used, the total carbon region should be calculated to include up to 29.5 two theta degrees. Parts of the broad feature of a mesophase peak may lie in this total carbon region. In the JADE software, the Peak Paint function can be used to obtain the peak area for the total carbon region from an XRD pattern. The total carbon region contains a mesophase peak at 26° two theta degrees if mesophase is present and a silicon peak at 28.50° two theta from a silicon standard added to the sample. Once the aggregate area of the peaks in the total carbon region is determined, the non-mesophase peaks in the total carbon region may be identified and their total area along with the area of the silicon peak calculated and subtracted from the aggregate area of the peaks in the total carbon region peak to provide the area of the mesophase peak. The non-mesophase peaks in the total carbon region can be identified using the JADE software which matches peak patterns in the plot to standard peak patterns in the ICDD database. Bauxite, for example, typically includes titania which provides a peak at 26.2 two theta degrees. Other non-mesophase may be identified to subtract the corresponding peak area from the mesophase peak area. The base line of the non-mesophase peak can be approximated by drawing a base line connecting the base of each side of the peak and demark it from the mesophase peak. These non-mesophase peaks in the total carbon region and the silicon peak are highlighted using the Peak Paint feature in the JADE software and their area calculated. The non-mesophase peaks are not typically significant relative to the area of the mesophase peak. The two areas for the mesophase peak and the silicon peak can then be used to calculate the proportional mesophase weight fraction in the sample by use of Formula (1):

$$X_m = X_{st}(A_m/A_{st}) \quad (1)$$

where $X_m$ is the proportional mesophase weight fraction in a sample, $X_{st}$ is the weight fraction of standard added to the sample such as silicon, $A_m$ is the mesophase peak area and $A_{st}$ is the peak area of the standard. The term "proportional mesophase weight fraction" is used because a correction factor accounting for the relationship between the standard and the mesophase peaks may be useful in Formula (1), but we do not expect the correction factor to significantly change the result in Formula (1). The mesophase yield fraction which is the mesophase produced per hydrocarbon fed to the SHC reactor by weight should be calculated to determine whether the mesophase produced in the reaction is too high thereby indicating the risk of too much coke production. The yield fraction of TIOR produced in a reaction per hydrocarbon feed by weight is calculated by Formula (2):

$$Y_{TIOR} = M_{TIOR}/M_{HCBN} \quad (2)$$

where $Y_{TIOR}$ is the yield fraction of TIOR in the product; $M_{TIOR}$ is the yield mass of TIOR in the product and $M_{HCBN}$ is the mass of hydrocarbon in the feed. Masses can be used in the calculation as mass flow rates in a continuous reaction or static masses in a batch reaction. The mesophase yield fraction is calculated by Formula (3):

$$Y_{mesophase} = X_m * Y_{TIOR} \quad (3)$$

where $Y_{mesophase}$ is the mesophase yield fraction. These formulas enable calculation of the yield fraction of TIOR, $Y_{TIOR}$, which is mass of TIOR produced per mass of hydrocarbon fed to the SHC reactor which can be multiplied by the fraction of mesophase in the TIOR sample, $X_m$, to determine the yield fraction of mesophase, $Y_{mesophase}$, which is mass of mesophase produced per mass of hydrocarbon fed to the SHC reactor. If the yield fraction of mesophase exceeds 0.5 wt-%, the severity of an SHC reactor should be reduced to avoid excessive coking in the reactor because mesophase production is substantial. In other embodiments, severity should be moderated should the yield fraction of mesophase exceed as little as 0.3 and as high as 0.8 wt-%.

The amount of mesophase determined by the optical PLM method of ASTM D 4616-95 is a method that samples a two dimensional area which is a volume fraction. The XRD method samples a three dimensional volume and should give a more accurate indication of mesophase in terms of weight fraction relative to feed. It would not be expected for the two methods to give the identical result, but they should correlate.

Example 1

A feed suitable for SHC is characterized in Table I. Unless otherwise indicated, this feed was used in all the Examples.

TABLE I

| Test | Vacuum Bottoms (975° F.+) |
|---|---|
| Specific Gravity, g/cc | 1.03750 |
| API gravity | −0.7 |
| ICP Metals | |
| Ni, wt. ppm | 143 |
| V, wt. ppm | 383 |
| Fe, wt. ppm | 68.8 |
| Microcarbon residue, wt-% | 25.5 |
| C, wt-% | 80.3 |
| H, wt-% | 9.0 |
| N, wt-% | 0.4 |
| Total N, wt. ppm | 5744 |
| Oxygen, wt-% in organics | 0.78 |
| Sulfur, wt-% | 7 |
| Ash, wt-% | 0.105 |
| Heptane insolubles, wt-% | 16.1 |
| Pentane insolubles, wt-% | 24.9 |
| Total chloride, mass ppm | 124 |
| Saybolt viscosity, Cst 150° C. | 1400 |
| Saybolt viscosity, Cst 177° C. | 410 |

"ICP" stands for Inductively Coupled Plasma Atomic Emissions Spectroscopy, which is a method for determining metals content.

Example 2

A TIOR sample from an SHC reaction using heavy oil feed from Example 1 and 0.7 wt-% iron content on iron sulfate monohydrate catalyst as a percentage of non-gaseous materials in the SHC reactor was analyzed for mesophase using an XRD method. A sample of SHC product material was blended with toluene, centrifuged and the liquid phase decanted. These steps were repeated on the remaining solids. The solids remaining were then dried in a vacuum oven at 90° C. for 2 hours. Silicon standard was added to the sample to give a concentration of 5.3 wt-% by adding silicon solid and acetone solvent to a sample of TIOR and slurried together with a mortar and pestle. The acetone evaporated out of the slurry to leave a solid comprising TIOR blended with silicon standard. An approximately 1 gram sample of the solid sample with blended standard was spread onto a XRD sample holder and placed into the XRD instrument and scanned using parameters of 2.0/70.0/0.04/10 (sec). The XRD instrument was a Scintag X1 instrument which is a fixed slit system equipped with a theta-theta goniometer, a Peltier-cooled detector and a copper tube. The XRD instrument was run at settings of 45 kV and 35 mA. The resulting data was plotted using JADE software which was loaded on the XRD instrument.

Figure 2:
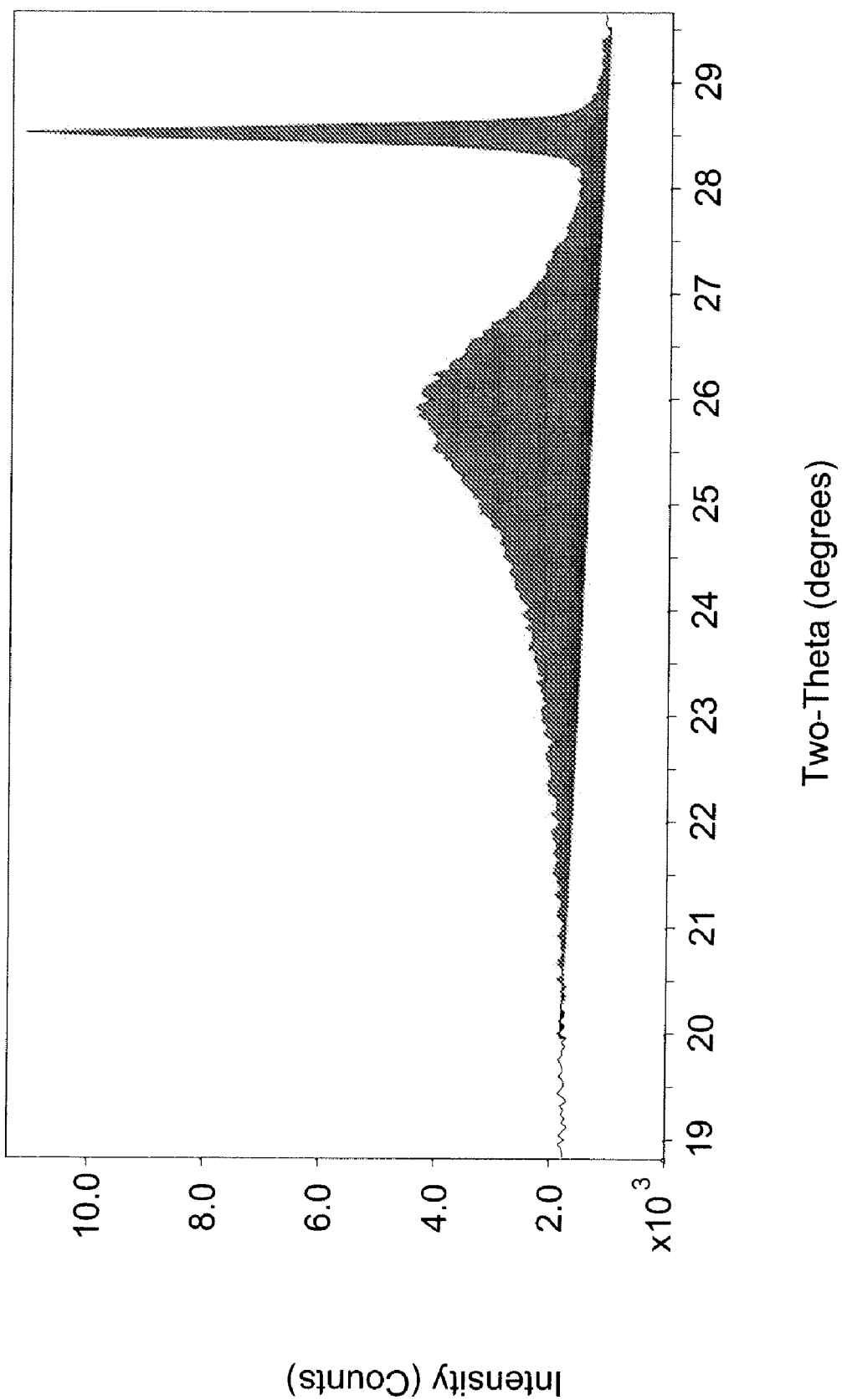
FIG. 2 is a plot of an XRD of a sample of TIOR with the peaks in the hydrocarbon region shaded.
Figure 3:
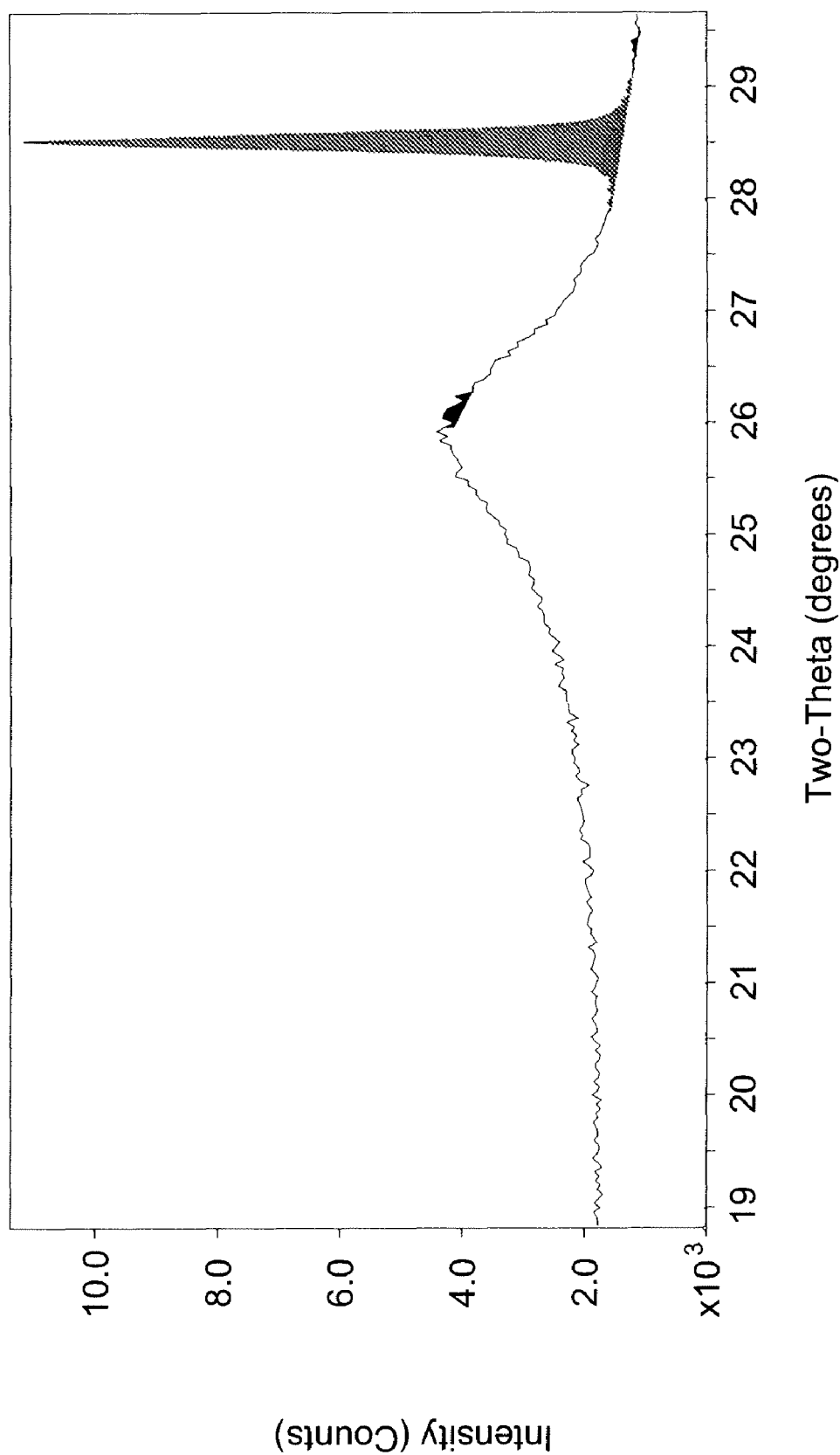
FIG. 3 is a plot of an XRD of a sample of TIOR with the non-mesophase peaks shaded in the hydrocarbon region.

FIGS. 2 and 3 show an XRD plot of the resulting TIOR sample. A peak with a centroid at 26.0 2-theta degrees represents the existence of mesophase. The aggregate area of the peaks in the total carbon region from 20° 2-theta degrees to the right most edge of a silicon peak at 28.5° two theta degrees as shown shaded in FIG. 2 was calculated to be 253,010 area counts using the Peak Paint function of JADE software. The right-most edge of the peak in the total carbon region was at about 29.5 two theta degrees. The non-mesophase peaks in the total carbon region are identified and shaded along with the silicon peak with a centroid at 28.5 two theta degrees in FIG. 3 using the Peak Paint function. Bauxite, for example, typically includes titania which provides a peak at 26.2 two theta degrees. Other non-mesophase peaks are identified as such and highlighted in FIG. 3. The base lines of the non-mesophase peaks are shown in FIG. 3 with base lines connecting the base of each side of the respective peak to demark it from the rest of the mesophase peak. These non-mesophase peaks in the total carbon region and the silicon peak are highlighted using the Peak Paint feature in the JADE software to calculate their area. The area of the silicon peak is 43,190 area counts, and the area other non-mesophase peaks in the total carbon region is 1,374 area counts which is relatively insignificant. The aggregate area of the peaks not associated with mesophase in the hydrocarbon range was calculated using Peak Paint to be 44,564 area counts. The non-mesophase area was subtracted from the aggregate area of the peaks in the total carbon region peak to provide an area of the mesophase peak of 208,446 area counts. The two areas for the mesophase peak and the silicon peak were then used to calculate the percent mesophase by Formula (1):

$$X_m = 0.053*(208446/43190) = 0.2558 \quad (1).$$

To determine the yield fraction of TIOR, Formula (2) is used for which:

$$Y_{TIOR} = M_{TIOR}/M_{HCBN} = 18.85 \text{ g TIOR}/342 \text{ g HCBN} = 0.0551 \quad (2).$$

Accordingly, Formula (3) is used to determine the yield fraction of mesophase:

$$Y_{mesophase} = X_m * Y_{TIOR} = 0.249*0.0551 = 0.0141 \quad (3).$$

The $Y_{mesophase}$ expressed as a percentage of 1.41 wt-% correlates to the mesophase concentration of 1.22% determined by PLM using ASTM D 4616-95. Since the mesophase yield fraction is substantial in that it is above 0.5 wt-% the reaction was in danger of excessive coking which should prompt moderating its severity.

Example 3

Figure 4:
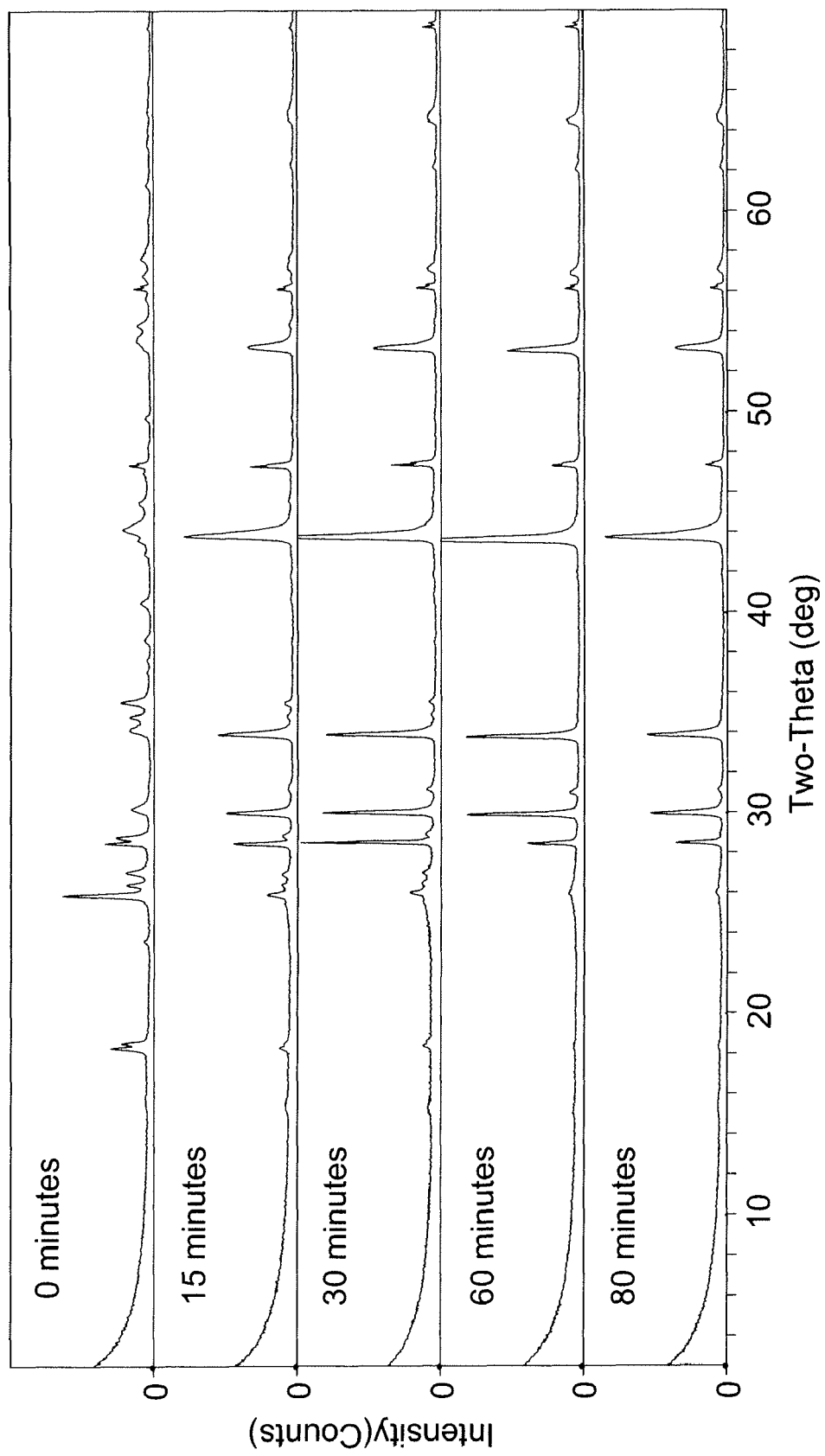
FIG. 4 is a series of XRD plots for TIOR made with iron sulfate catalyst.

In this example, we examined the ability of iron in iron sulfate monohydrate to convert to the active iron sulfide. Iron sulfate monohydrate was mixed with vacuum resid of Example 1 at 450° C. and 2000 psi (137.9 bar) in an amount such that 2 wt-% iron was present relative to the non-gaseous materials in the reactor. The temperature was chosen because it is the optimal temperature for pitch conversion for sulfur monohydrate catalyst. The semi-continuous reaction was set up so that hydrocarbon liquid and catalyst remained in the reactor; whereas, 6.5 standard liters/minute (sl/m) of hydrogen were fed through the reaction slurry and vented from the reactor. X-ray diffraction (XRD) characterization of solid material separated from vacuum resid feed during different stages of the reaction shows that the transformation of $Fe(SO_4).H_2O$ to FeS is comparatively slow. FIG. 4 shows XRD patterns from samples taken from the semi-continuous reaction at various time intervals. FIG. 4 shows intensity versus two theta degrees for four XRD patterns taken at 0, 15, 30, 60 and 80 minutes going from highest to lowest patterns in FIG. 4. Time measurement began after the reactor was heated for 30 minutes to reaction conditions. The presence of $Fe(SO_4).H_2O$ is indicated in the XRD pattern by a peak at 18.3 and 25.9 two theta degrees. Table II below gives the proportion of $Fe(SO_4).H_2O$ at time. After reactor heat up at 0 minutes, only about 30 wt-% of the Fe is present as iron sulfide shown by a peak at 44 two theta degrees. Only after 80 minutes is most of the $Fe(SO_4).H_2O$ converted to FeS.

TABLE II

| Reaction Time (minutes) | Fe(SO$_4$)•H$_2$O (wt-%) |
|---|---|
| 0 | 70 |
| 15 | 16 |
| 30 | 14 |
| 60 | 5 |
| 80 | 4 |

Example 4

Figure 5:
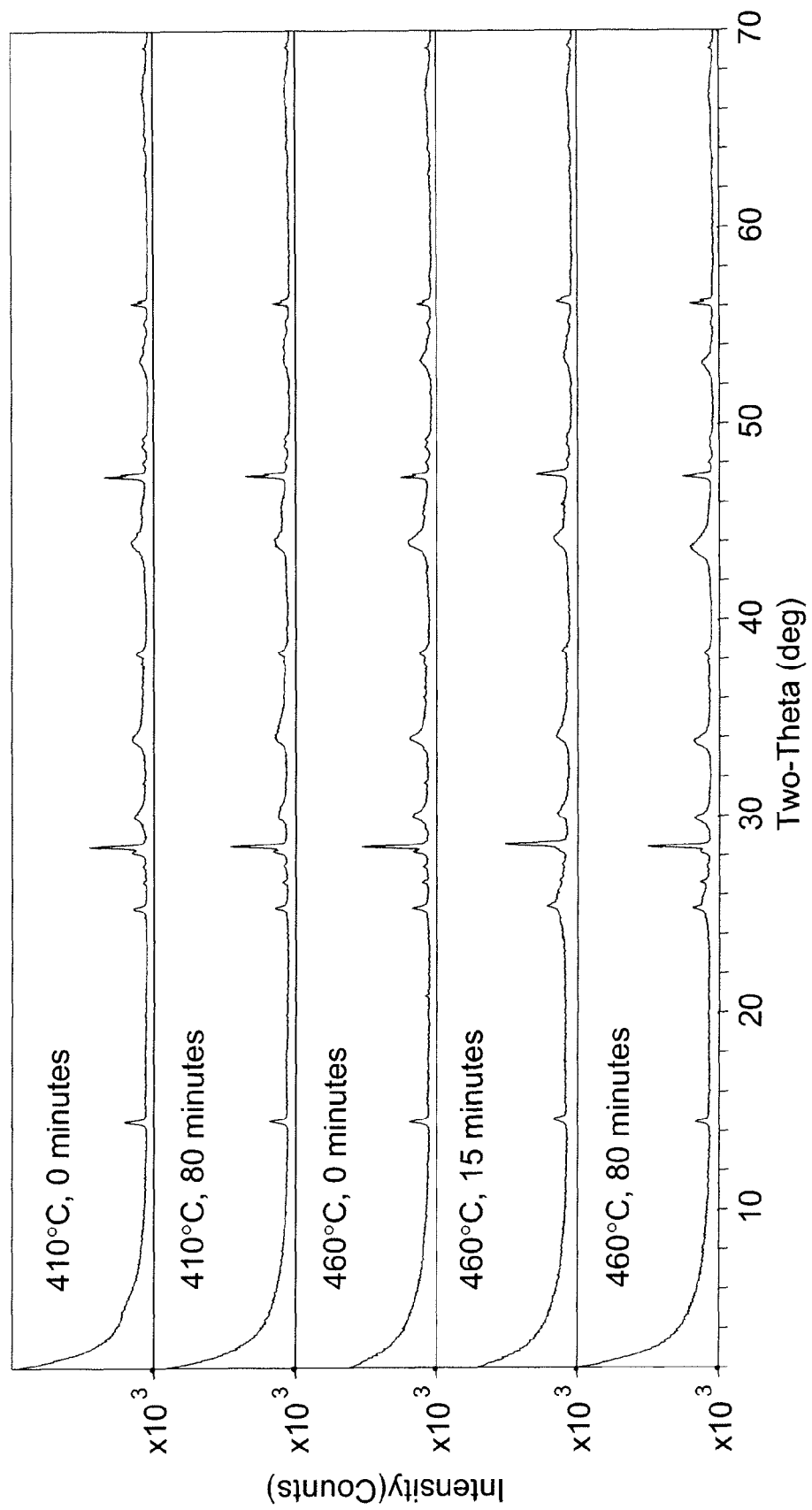
FIG. 5 is a series of XRD plots for TIOR made with the catalyst of the present invention.

In order to understand the formation of iron sulfide from bauxite an experiment was performed by charging vacuum resid of Example 1 to the semi-continuous reactor at 460° C., 2000 psi (137.9 bar), and feeding hydrogen through the resid at 6.5 sl/m. The bauxite catalyst was present in an amount such that 0.7 wt-% iron was in the reactor relative to the hydrocarbon liquid and catalyst. The reaction was run for 80 minutes after the reactor was preliminarily heated for 30 minutes. XRD patterns were taken of solids collected from the reaction at 0, 15 and 80 minutes after preliminary heat up. A second set of experiments were performed with the same reaction conditions, except the reactor temperature was set at 410° C. and solids were collected at 0 and 80 minutes after preliminary heat up. The XRD patterns are shown in FIG. 5. The experiments conducted at 460° C. are the lowest three XRD patterns in FIG. 5, and the experiments conducted at 410° C. are the highest three XRD patterns in FIG. 5. In all cases, iron sulfide had already formed by the time the reactor reached both reaction temperatures indicated by the peak at 44 two theta degrees. No evidence of iron oxide is present in any of the XRD patterns indicating that essentially all of the iron oxide had converted to iron sulfide.

Example 5

Bauxite containing 17.7 wt-% Fe present as Fe$_2$O$_3$ and 32.9% wt-% Al present as boehmite alumina was compared with other bulk available, iron-containing minerals such as iron sulfate monohydrate and Yandi limonite ore from various sources. Particle size characterizations were determined using the wet method of ASTM UOP856-07. The characterization data for all of the materials are shown in Table III.

TABLE III

| Sample Description | Bauxite | Iron Sulfate monohydrate | Hematite | Limonite Fines |
|---|---|---|---|---|
| Al, wt-% | 32.9 | | <0.006 | 0.7 |
| Fe, wt-% | 17.7 | 29.1 | 67.8 | 52.4 |
| Ti, wt-% | 1.88 | | <0.003 | 0.029 |
| LOI at 900° C., mass-% | 7.6 | 54.6 | 0.8 | 17.1 |
| Iron Compound | Fe$_2$O$_3$ | Fe(SO$_4$) | Fe$_2$O$_3$ | FeOOH |
| Iron compound, wt-% | 25.3 | 79.1 | 97.0 | 83.4 |
| SiO$_2$ | | | | 4.5 |
| Al$_2$O$_3$ | 62.2 | | | 1.3 |
| S | 0.0 | 18.7 | | 0.0 |
| BET surface area, m$^2$/g | 159.0 | | 5.0 | 94.0 |
| LANG surface area, m$^2$/g | 276.0 | | | 162.0 |
| pore volume, cc/g | 0.2 | | 0.0 | 0.1 |
| pore diameter, A | 53.0 | | 104.0 | 41.0 |
| Particle size | | | | |
| median diameter, μ | 1.2 | 2.9 | 3.8 | 2.8 |
| Mean diameter, μ | 1.0 | 2.3 | 2.7 | 26.7 |
| <10μ | 0.5 | 1.1 | 1.3 | 0.3 |
| <25μ | 0.7 | 1.8 | 2.4 | 0.9 |
| <50μ | 1.2 | 2.9 | 3.8 | 2.8 |
| <75μ | 1.9 | 4.1 | 5.3 | 26.9 |
| <90μ | 2.8 | 5.5 | 6.9 | 91.1 |

In a typical experiment, 334 grams of vacuum resid of Example 1 was combined in a 1 liter autoclave with one of the iron sources, adding the iron at between 0.4 and 2 wt-%. In the examples cited in Table IV, the autoclave was heated to 445° C. for 80 minutes at 2000 psi (137.9 bar). Hydrogen was continuously added through a sparger and passed through the reactor at a rate of 6.5 standard liters per minute and removed through a back pressure valve to maintain pressure. The hydrogen stripped out the light products which were condensed in cooled knock-out trap pots. Some of the limonite catalysts were pretreated by adding 1 or 2 wt-% sulfur relative to the feed and catalyst and heating the mixture to 320° or 350° C. at 2000 psi (137.9 bar) over hydrogen for an hour to activate the catalyst before heating the mixture to reaction temperature.

In Table IV, "mesophase yield, XRD, wt-% indicates mesophase identified by XRD and is expressed relative to the total hydrocarbon feed. "Mesophase optical" is a percentage of mesophase identified in a sample examined by polarized light microscopy. All of the yield numbers are calculated as a ratio to the feed.

TABLE IV

| | Bauxite | | | | | | | Iron sulfate monohydrate | |
|---|---|---|---|---|---|---|---|---|---|
| | Run | | | | | | | | |
| Sample Description | 522-12 | 522-13 | 522-125 | 522-124 | 522-82 | 522-87 | 522-84 | 523-4 | 522-132 |
| Pretreatment | no | no | no | no | No | no | no | no | no |
| Iron content, wt-% | 0.4 | 0.5 | 0.7 | 0.7 | 1.0 | 1.5 | 2.0 | 0.7 | 0.7 |
| Temperature, ° C. | 445 | 445 | 445 | 445 | 445 | 445 | 445 | 450 | 445 |
| Pitch conversion, wt-% | 82.3 | 82.1 | 82.0 | 83.1 | 82.6 | 82.5 | 83.4 | 76.88 | 78.4 |
| H$_2$S, CO & CO$_2$ yield, wt-% | 4.6 | 4.7 | 4.6 | 4.5 | 4.1 | 3.4 | 3.4 | 4.6 | 4.4 |
| C$_1$-C$_4$ yield, wt-% | 9.8 | 9.8 | 9.3 | 9.2 | 9.2 | 8.8 | 7.5 | 11.6 | 10.9 |
| Naphtha (C$_5$-204° C.) yield, wt-% | 24.9 | 21.0 | 22.9 | 22.5 | 20.8 | 19.2 | 19.8 | 21.1 | 24.9 |
| LVGO (204° C.-343° C.) yield, wt-% | 24.9 | 25.0 | 24.9 | 24.6 | 27.4 | 25.2 | 29.6 | 25.8 | 22.8 |
| HVGO (343° C.-524° C.) yield, wt-% | 21.7 | 21.6 | 21.8 | 21.9 | 22.2 | 24.4 | 22.4 | 13.1 | 15.2 |
| Pitch (524° C.+) yield, wt-% | 16.0 | 16.2 | 16.1 | 15.1 | 15.5 | 15.8 | 15.0 | 20.6 | 19.3 |
| C$_5$-524° C. yield, wt-% | 71.4 | 67.5 | 69.6 | 69.0 | 70.4 | 68.8 | 71.8 | 60.0 | 62.9 |
| TIOR yield, wt-% | 3.0 | 2.5 | 2.3 | 2.3 | 2.9 | 2.6 | 1.9 | 7.1 | 7.1 |
| Mesophase yield, XRD, wt-% | 0.22 | 0.15 | 0.03 | 0.07 | 0.00 | 0.00 | 0.00 | 1.03 | 0.75 |
| Mesophase, Optical, % | 0.11 | 0.28 | 0.00 | 0.07 | 0.00 | 0.00 | 0.00 | 1.70 | 0.94 |

TABLE IV-continued

| | Iron sulfate monohydrate | | Hematite | | Limonite | | | |
|---|---|---|---|---|---|---|---|---|
| | Run | | | | | | | |
| Sample Description | 522-81 | 522-41 | 522-65 | 522-122 | 522-74 | 522-86 | 522-73 | 522-77 |
| Pretreatment | no | no | no | no | no | 1% sulfur, 350° C. | 2% sulfur, 320° C. | 2% sulfur, 350° C. |
| Iron content, wt-% | 1.0 | 1.5 | 2.0 | 0.7 | 0.7 | 1.0 | 0.7 | 2.0 |
| Temperature, ° C. | 445 | 445 | 445 | 445 | 445 | 445 | 445 | 445 |
| Pitch conversion, wt-% | 79.1 | 81.8 | 80.0 | 79.3 | 70.1 | 79.1 | 75.0 | 83.1 |
| $H_2S$, CO & $CO_2$ yield, wt-% | 3.9 | 4.5 | 4.2 | 4.2 | 3.8 | 4.3 | 4.4 | 5.8 |
| $C_1$-$C_4$ yield, wt-% | 9.9 | 11.3 | 9.7 | 10.4 | 11.4 | 9.7 | 10.3 | 10.5 |
| Naphtha ($C_5$-204° C.) yield, wt-% | 22.7 | 22.3 | 20.4 | 25.1 | 1.5 | 22.6 | 1.2 | 21.5 |
| LVGO (204° C.-343° C.) yield, wt-% | 24.9 | 23.9 | 27.3 | 21.2 | 30.0 | 24.0 | 29.5 | 27.5 |
| HVGO (343° C.-524° C.) yield, wt-% | 17.1 | 15.5 | 15.3 | 16.3 | 30.1 | 17.8 | 32.3 | 20.4 |
| Pitch (524° C.+) yield, wt-% | 19.0 | 16.5 | 18.0 | 18.5 | 38.5 | 18.9 | 37.0 | 15.3 |
| $C_5$-524° C. yield, wt-% | 64.8 | 61.7 | 63.1 | 62.6 | 54.9 | 64.4 | 61.1 | 69.4 |
| TIOR yield, wt-% | 6.1 | 4.0 | 3.0 | 6.1 | 13.9 | 5.0 | 7.3 | 1.8 |
| Mesophase yield, XRD, wt-% | 0.43 | 0.37 | 0.22 | 0.89 | 0.00* | 0.41 | 4.65 | 1.02 |
| Mesophase, Optical, % | 0.50 | 0.39 | 1.77 | 0.12 | 4.53 | 6.13 | 1.35 | 3.72 |

*This number is not trusted. It is believed that the excessive TIOR shielded the mesophase from diffraction.

The iron oxide and alumina catalyst demonstrated higher conversion of pitch, higher $C_5$-524° C. yield and lower TIOR than comparative catalysts at similar iron contents. Only after extensive pretreatment and high 2 wt-% iron loading did limonite come close to rivaling 2 wt-% iron from bauxite after no pretreatment. The pretreated limonite was marginally better only in TIOR yield, but had unacceptably high mesophase yield. The bauxite example shows higher pitch conversion, $C_5$-524° C. yield and lower TIOR yield at 0.7 wt-% Fe than the comparative materials. The bauxite also out performs hematite which is 97 wt-% $Fe_2O_3$ suggesting that the alumina in bauxite provides a performance benefit. Conversion data from these experiments suggest that the slow formation of iron sulfide in iron sulfate monohydrate and limonite might impede conversion and undesirably increase the TIOR yield.

In many cases in Table IV, the amount of mesophase determined by the optical method of ASTM D 4616-95 correlates well to the amount of mesophase determined by XRD.

Example 6

Catalysts from the series of experiments used to generate data reported in Example 5 in which 0.7 wt-% iron relative to the weight of liquid and catalyst in the SHC reactor were recovered and examined by XRD spectroscopy and scanning electron microscope (SEM).

Figure 6:
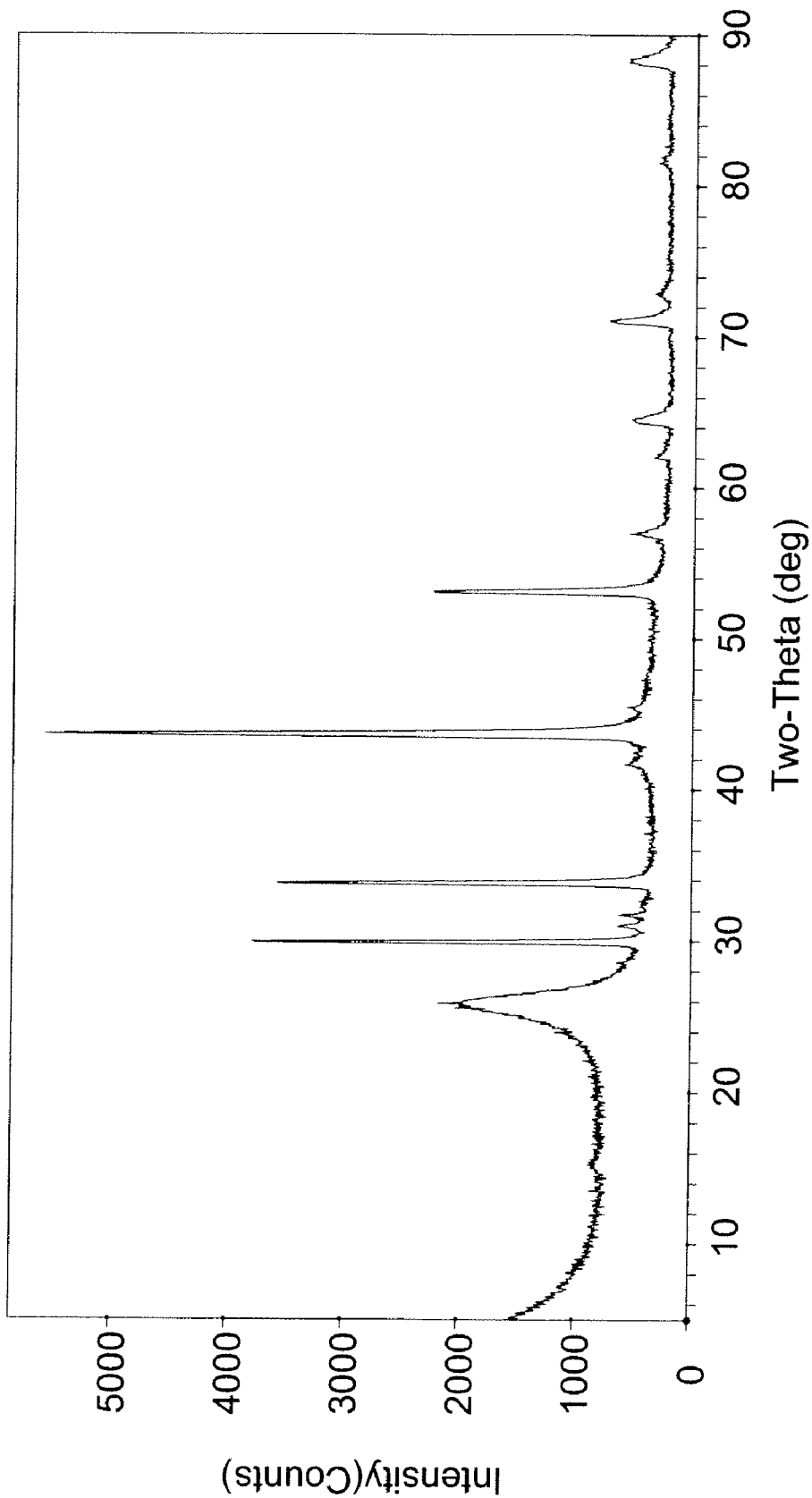
FIG. 6 is an XRD plot for TIOR made with iron sulfide monohydrate catalyst.

FIG. 6 shows an XRD pattern for iron sulfate monohydrate catalyst used in run 523-4 reported in Example 5. The XRD pattern in FIG. 6 shows a sharp peak at 43 two theta degrees identified as iron sulfide indicating relatively large crystallite material. The broad peak at 26 two theta degrees is identified as mesophase. A micrograph of the iron sulfide crystallites formed from iron sulfate monohydrate precursor crystallites from run 523-4 in FIG. 7 by SEM at 10,000 times indicates a variety of crystallite sizes ranging typically from 150 to 800 nm. The iron sulfide crystallites are the black particles in FIG. 7.

Figure 8:
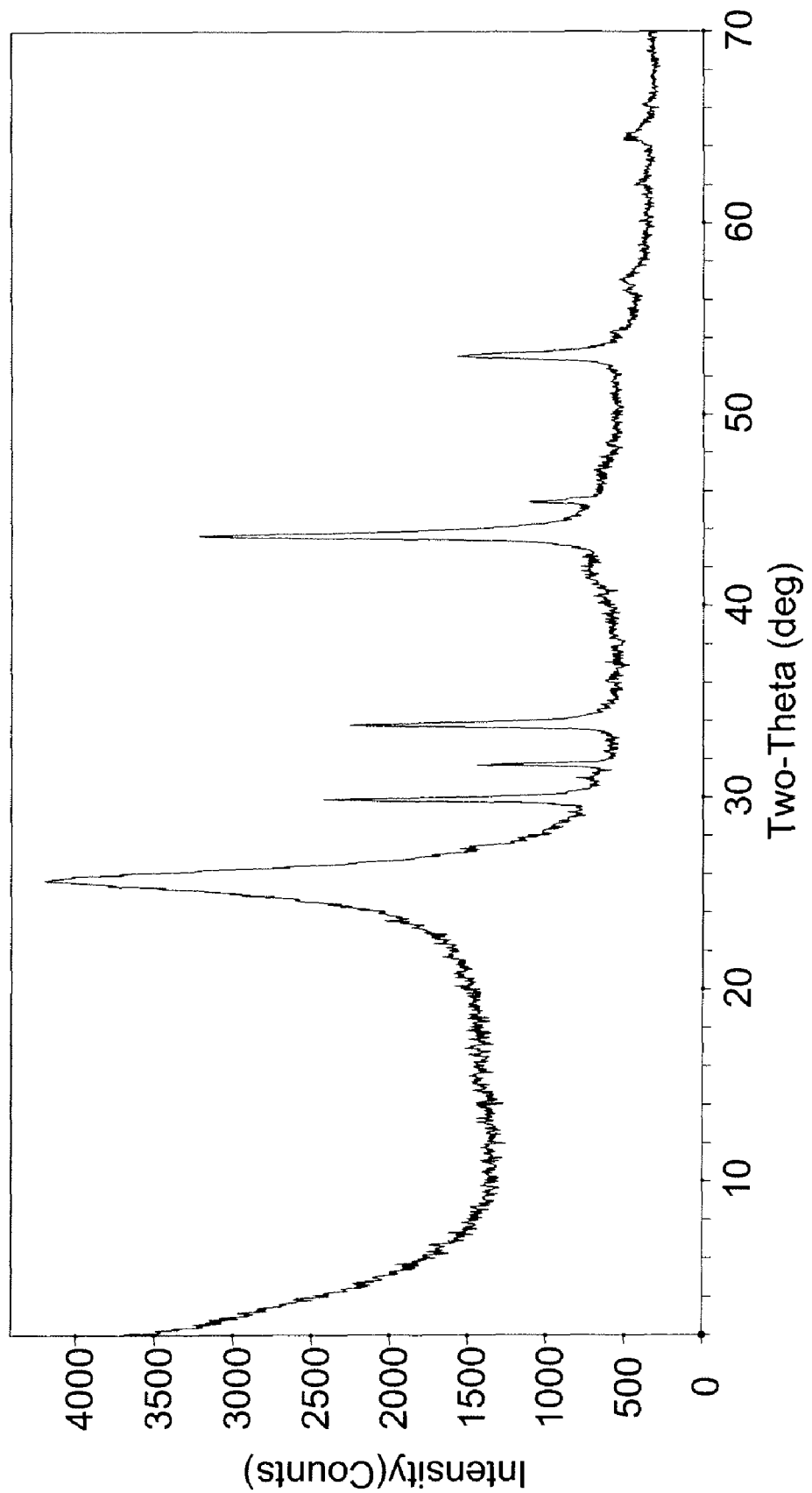
FIG. 8 is an XRD plot for TIOR made with limonite catalyst.

FIG. 8 shows an XRD pattern for the TIOR produced with limonite catalyst used in run 522-73 reported in Example 5. The XRD pattern in FIG. 8 also shows a sharp peak at 43 two theta degrees identified as iron sulfide indicating relatively large crystallite material. Again, a large, broad peak at 26 two theta degrees is identified as mesophase. A micrograph of the iron sulfide crystallites formed from limonite precursor crystallites from run 522-73 in FIG. 9 by SEM at 50,000 times indicates a variety of crystallite sizes ranging typically from 50 to 800 nm. The iron sulfide crystallites are the black particles in FIG. 9.

Figure 10:
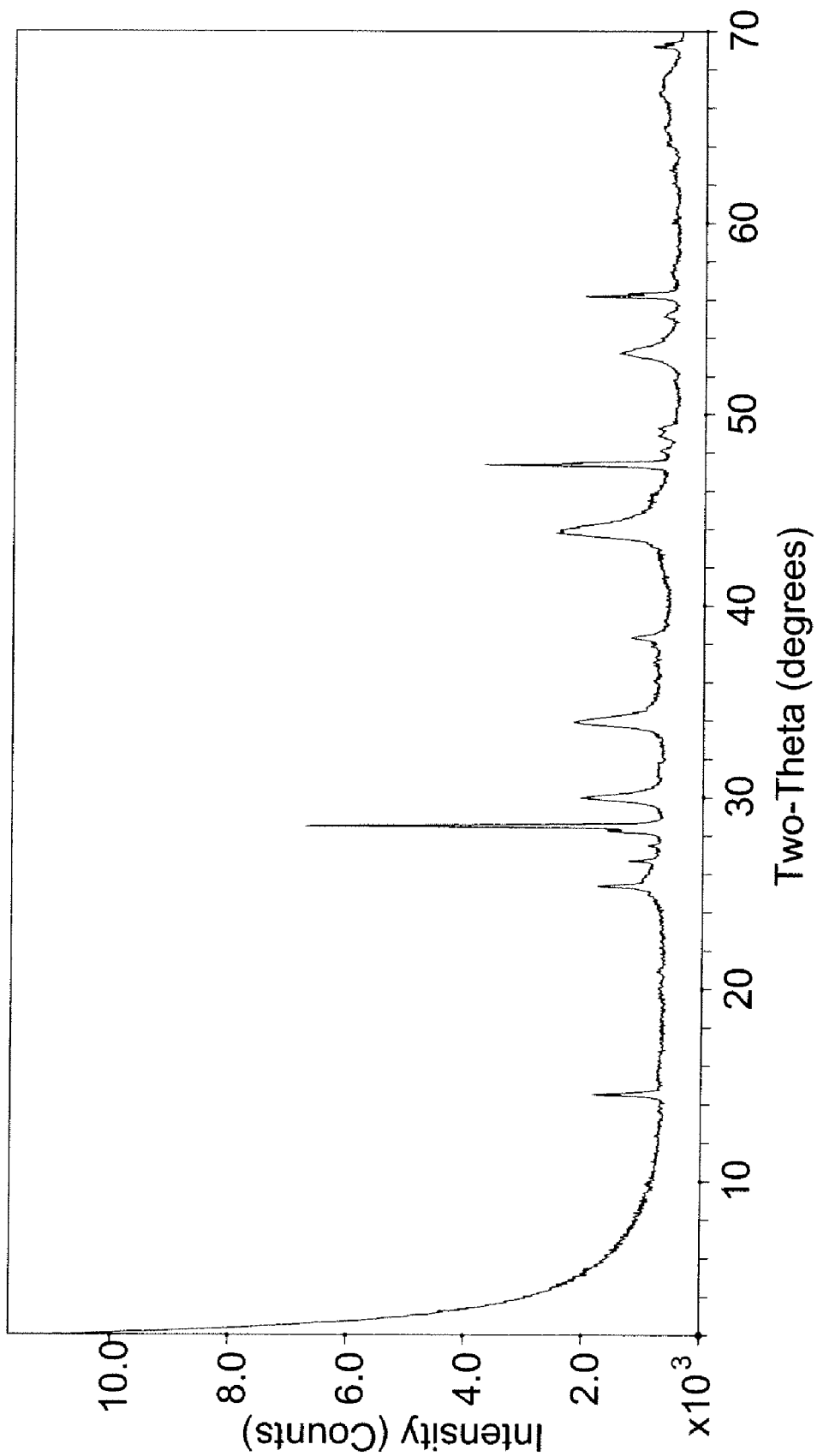
FIG. 10 is an XRD plot for TIOR made with bauxite catalyst.

FIG. 10 shows an XRD pattern for bauxite catalyst from run 522-125 reported in Example 5. The XRD pattern shows a broad, squat peak at 43 two theta degrees identified as iron sulfide. This broad peak shape is indicative of nano-crystalline material. No peak at 26 two theta degrees can be identified as mesophase. The peak at 25.5 two theta degrees is likely titania present in the bauxite and/or silver which is suspected to be a contaminant from a gasket on the equipment. The peak at 26.5 two theta degrees is also likely a silver chloride contaminant. The peak at 28 two theta degrees is boehmite in the catalyst. Because bauxite also contains a considerable amount of boehmite alumina in addition to iron, the crystallite size of the iron sulfide was indeterminate from the SEM.

Figure 11:
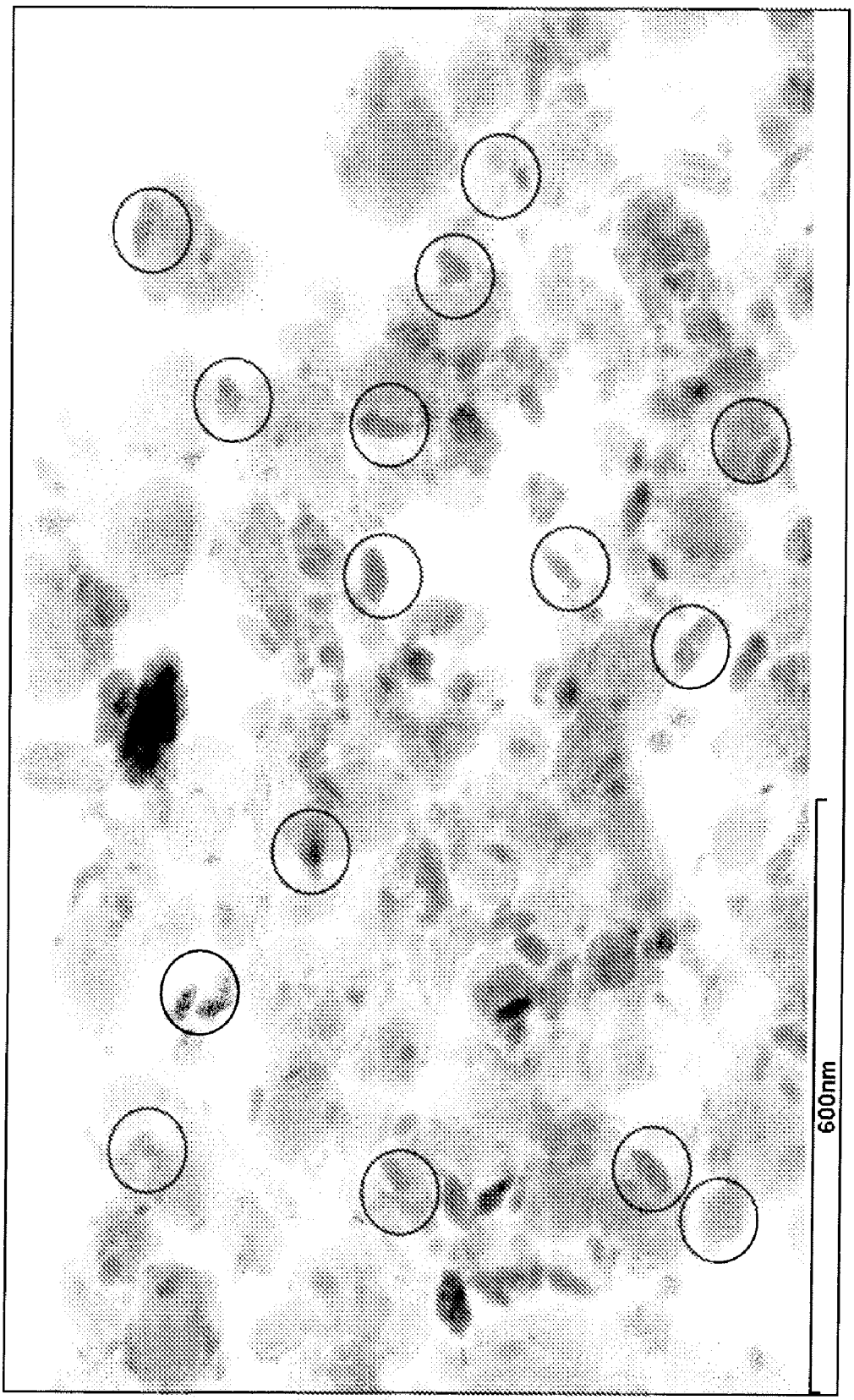
FIG. 11 is a STEM micrograph of bauxite catalyst.

A micrograph of bauxite catalyst used in the run 522-82 reported in Example 5 is shown in FIG. 1. The micrograph in FIG. 11 was made by scanning transmission electron microscopy (STEM) compositional x-ray mapping. The micrograph indicates that the boehmite particles range in size from 70 to 300 nm while the iron sulfide crystallites range uniformly at about 25 um between about 15 and about 40 nm. The iron sulfide crystallites are the darker materials in FIG. 11 and several are encircled as examples. Many of the iron sulfide crystallites are identified as single crystallites in FIG. 11. The alumina particles are the larger, lighter gray materials in FIG. 11. The dark black material in the top center of FIG. 11 is believed to be an impurity.

Little or no mesophase was indicated for the iron oxide and alumina catalyst by XRD while the other catalysts formed significant amounts of mesophase when 0.7 wt-% iron content was present in the SHC reaction zone.

Example 7

TIOR from the series of experiments used to generate the data in Example 5 in which 0.7 wt-% iron relative to the weight of liquid and catalyst in the SHC reactor were recovered and examined by polarized light microscopy (PLM) using ASTM D 4616-95 to confirm the indications of mesophase in Examples 5 and 6.

Figure 7:
FIG. 7 is a SEM micrograph of iron sulfide monohydrate catalyst.
Figure 12:
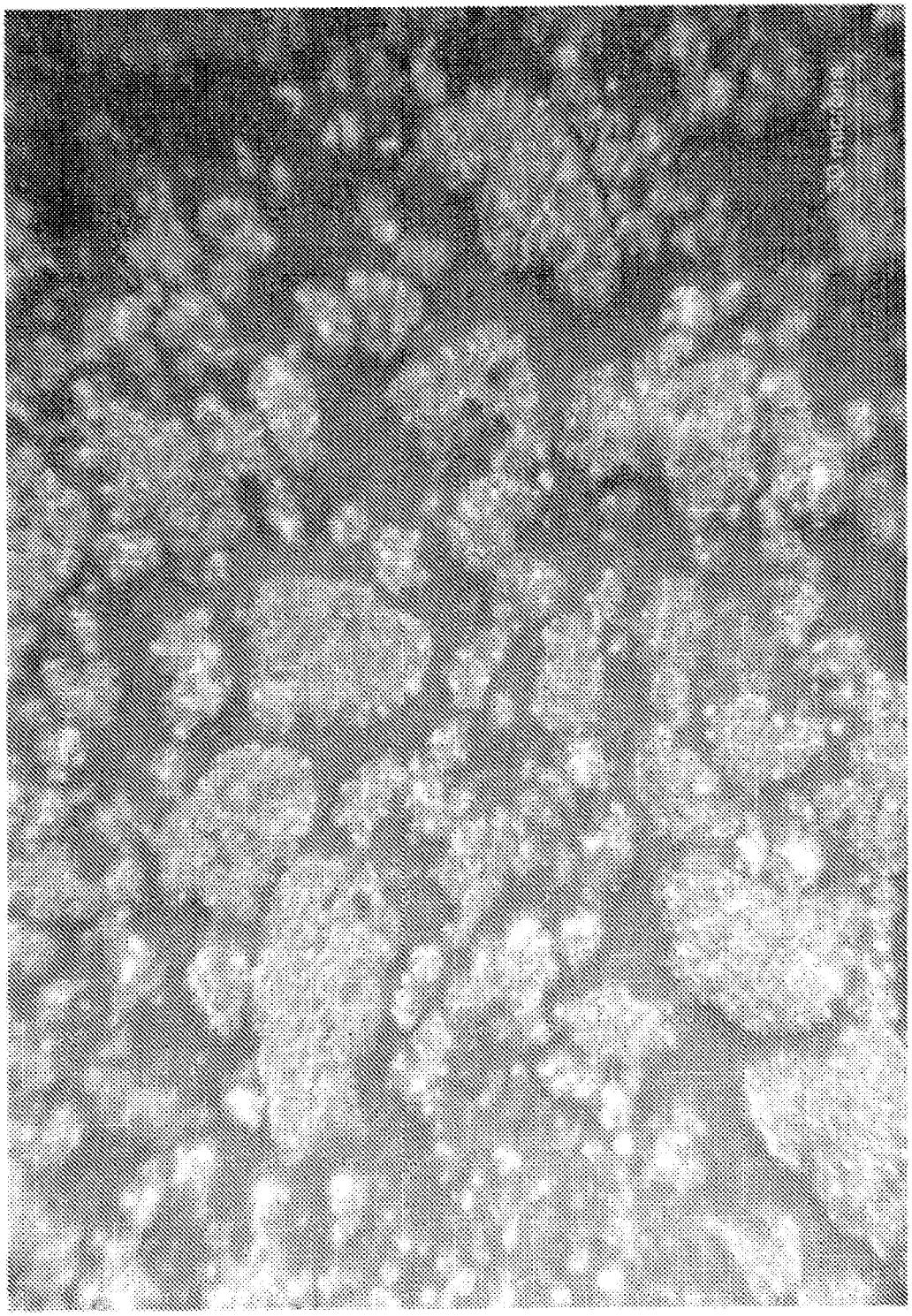
FIG. 12 is a PLM micrograph of TIOR made with iron sulfide monohydrate catalyst.

FIG. 12 is a PLM photograph of TIOR produced from run 523-4 with iron sulfate monohydrate catalyst reported in Example 5 and for which catalyst an XRD pattern is given in FIG. 6 and a SEM micrograph is given in FIG. 7 in Example 6. The photograph in FIG. 12 shows a significant amount of material coalesced together indicating mesophase. The PLM photograph in FIG. 12 supports results from XRD analysis that mesophase was present by the existence of the peak at 26 two theta degrees and the amount of optical mesophase calculated by ASTM D 4616-95 of 1.7% and by XRD of 1.03 wt-%.

Figure 9:
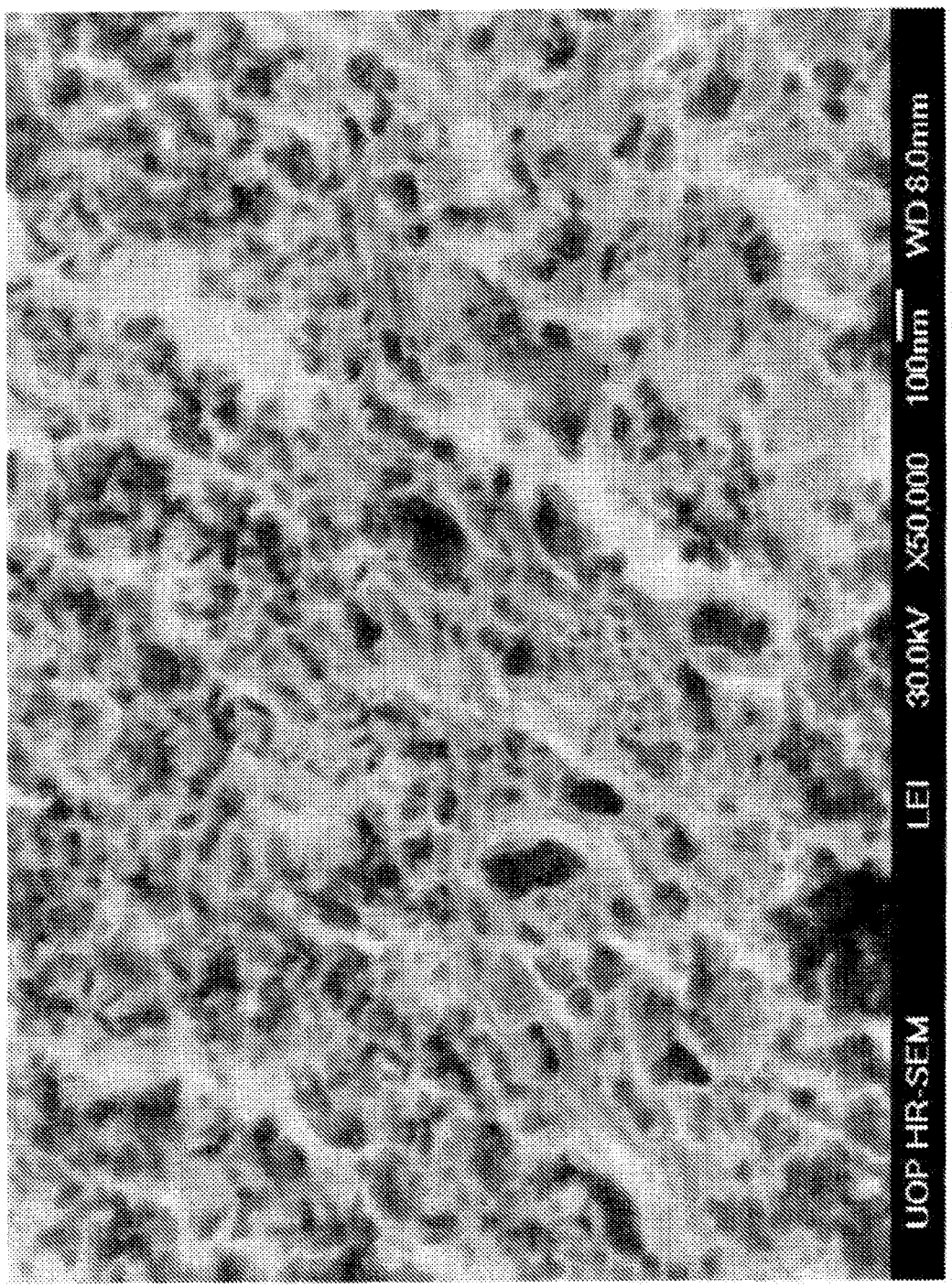
FIG. 9 is a SEM micrograph of limonite catalyst.
Figure 13:
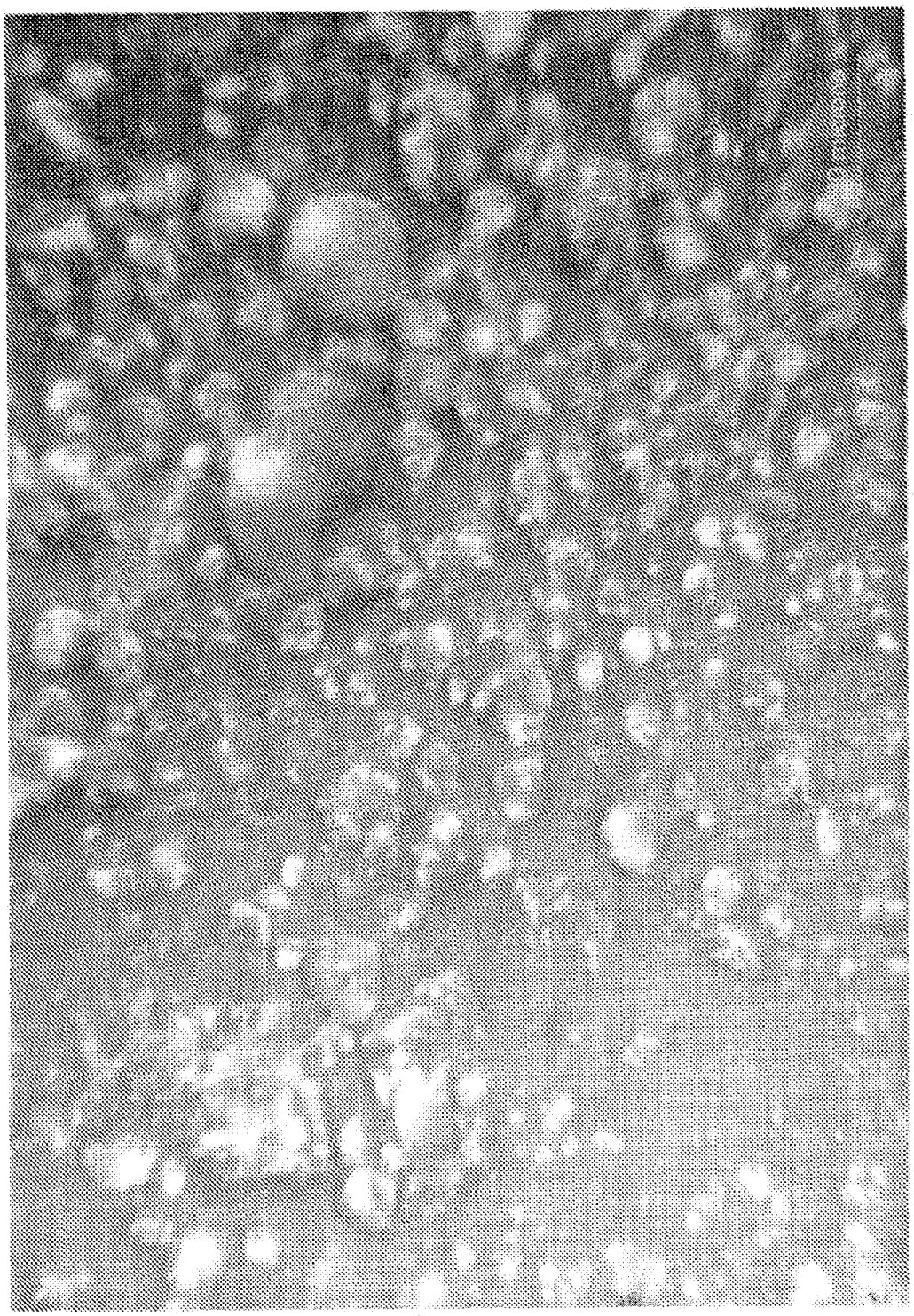
FIG. 13 is a PLM micrograph of TIOR made with limonite catalyst.

FIG. 13 is a PLM photograph of TIOR from run 522-73 with limonite catalyst reported in Example 5 and for which an XRD pattern is given in FIG. 8 and a SEM micrograph is shown in FIG. 9. The photograph in FIG. 13 shows less material coalesced together than in FIG. 12, but the bubble-like formations indicate mesophase. The PLM photograph in FIG. 13 supports results from XRD analysis that mesophase was present by the existence of the peak at 26 two theta degrees in FIG. 8 and the amount of optical mesophase calculated by ASTM D 4616-95 of 4.65% and by XRD of 1.35 wt-%.

Figure 14:
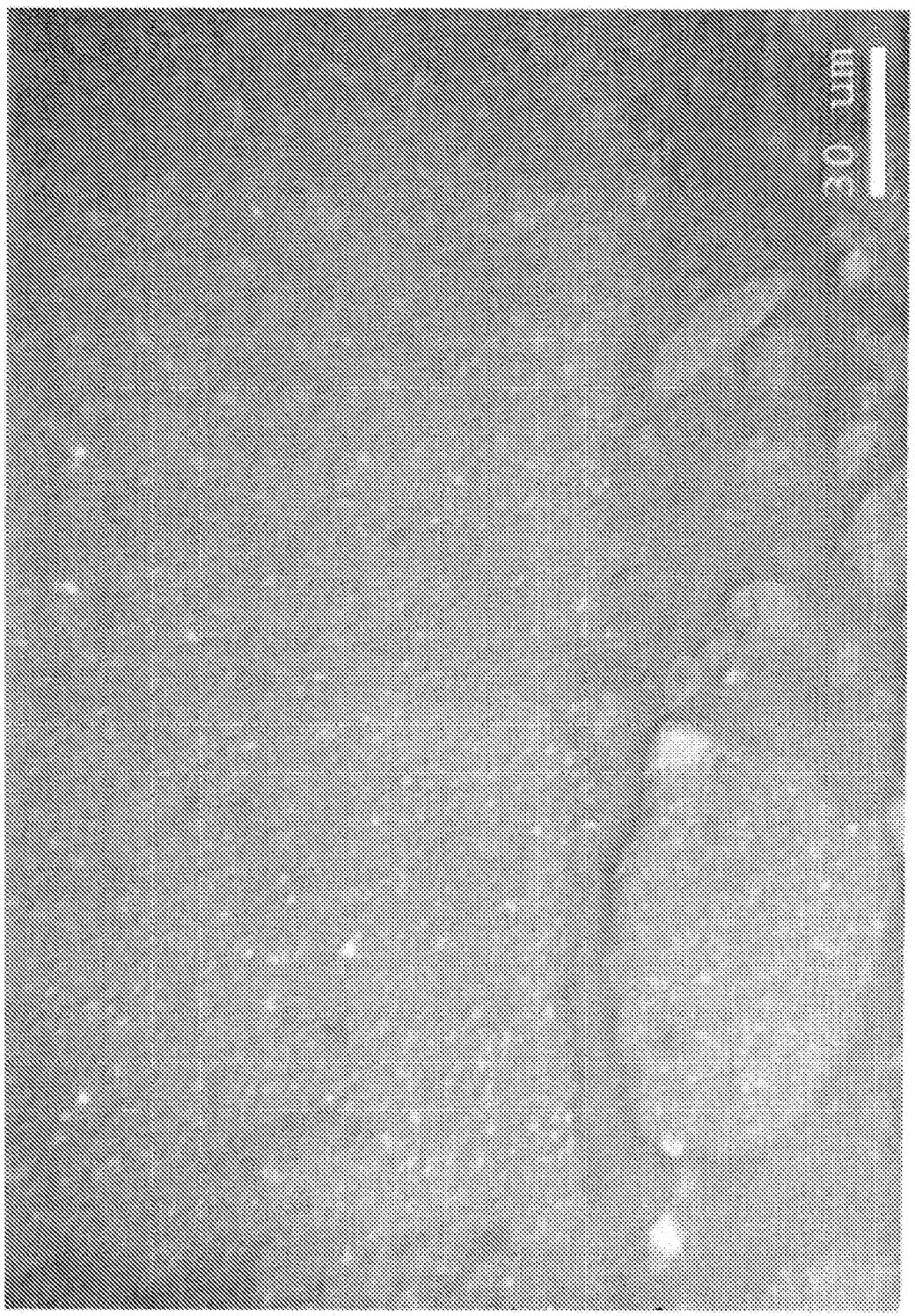
FIG. 14 is a PLM micrograph of TIOR made with bauxite catalyst.

FIG. 14 is a PLM photograph of TIOR from run 522-125 produced with bauxite catalyst reported in Example 5 and for which an XRD pattern is given in FIG. 11. The micrograph in FIG. 14 shows much less coalescing material than in FIGS. 12 and 13. Only trace amounts of mesophase are present in the PLM micrograph supporting results from XRD analysis that substantially no mesophase was present by the existence of the peak at 26 two theta degrees and the amount of mesophase calculated by ASTM D 4616-95 of 0.00 and by XRD of 0.03 wt-%.

Example 8

A bauxite catalyst containing alumina and iron oxide used in run 522-124 reported in Example 5 was compared to iron oxide without alumina, iron oxide with boehmite alumina, iron sulfate, and iron sulfate with boehmite alumina using the feed of Example 1. Reaction conditions included a semi-continuous reactor at 445° C., pressure of 2000 psi (137.9 bar), a residence time of 80 minutes and iron on catalyst in the reaction zone per hydrocarbon and catalyst of 0.7 wt-%. Results are shown in Table V.

TABLE V

| | Catalyst | | | | |
|---|---|---|---|---|---|
| | Bauxite | Fe$_2$O$_3$ | Fe$_2$O$_3$ + Boehmite | Fe(SO$_4$) | Fe(SO$_4$) + Boehmite |
| Run | 522-124 | 522-116 | 522-109 | 522-114 | 522-111 |
| Aluminum content, wt % | 1.2 | 0 | 1.2 | 0 | 1.2 |
| Conversion, wt-% | 83.1 | 81.1 | 79.9 | 78.1 | 81.2 |
| C5 to 525° C. yield, wt-% | 69.0 | 67.3 | 62.6 | 63.1 | 65.2 |
| TIOR yield, wt-% | 2.3 | 4.9 | 5.1 | 7.2 | 3.7 |
| Mesophase yield, XRD, wt-% | 0.07 | 0.60 | 0.35 | 0.95 | 0.36 |

In each case and for all parameters, addition of the alumina reduces mesophase generation of the iron containing catalyst. Addition of boehmite alumina improves the performance of iron sulfate in all categories, but does not appear to help iron oxide except in mesophase reduction. Bauxite has the best performance in each category.

Example 9

The iron oxide and alumina catalyst of the present invention was also tested for the ability to increase the flowability of heavy hydrocarbon as measured by API index. Heavy vacuum bottoms feed of Example 1 having an API index of −0.7 degrees was fed to the reactor described in Example 4 under similar conditions without any pretreatment of the catalyst. The catalyst comprised 3.7 wt-% of the non-gaseous material in the reactor. Iron comprised 17.7 wt-% of the catalyst, so that 0.7 wt-% of the hydrocarbon and catalyst in the reactor comprised iron. The mean particle diameter of the bauxite was between 1 and 5 microns with a BET surface area of 159 m$^2$/g. Differing conditions and results are provided in Table VI.

TABLE VI

| Example | 1 | 2 |
|---|---|---|
| Pressure | 2000 | 1500 |
| Temperature, ° C. | 455 | 460 |
| Reaction time, minutes | 80 | 80 |
| Liquid selectivity, wt-% | 81.9 | 81.0 |
| Coke yield, wt-% of feed | 1.7 | 0.6 |
| Gas selectivity, wt-% | 16.4 | 18.9 |
| API of Liquid Product | 24.0 | 23.8 |
| % Increase in API | 2470 | 2450 |

Table VI shows that the iron and alumina containing catalyst provides an uplift in flowability in terms of API gravity of about 24 times.

Example 10

The alumina and iron containing catalysts were tested with varying water contents to determine the effect of water on performance on the same bauxite catalyst. The conditions of 455° C., 2000 psi (137.9 bar), a semi-continuous reactor with 6.5 sl/min of hydrogen and residence time of 80 minutes were constant for all the experiments. Iron content of catalyst per non-gas material in the SHC reactor was also constant at 0.7 wt-%. The bauxite catalyst tested comprised 39.3 wt-% alumina, 15.4 wt-% iron oxide and a loss on ignition (LOI) at 900° C. of 38.4 wt-% which predominantly represents water, had a BET surface area of 235 m$^2$/g and a mean particle diameter of 299 microns. Water content on catalyst indicated by loss on ignition (LOI) at 900° C. was varied as shown in Table VII by drying. Throughout the experiments, the catalyst comprised 63.8 wt-% alumina and 25.0 wt-% iron oxide on a non-volatile basis.

TABLE VII

| Sample | 523-87 | 523-93 | 523-94 |
|---|---|---|---|
| LOI, wt-% | 38.4 | 23.3 | 10.6 |
| Pitch conversion, wt-% | 84.42 | 84.31 | 84.25 |
| C1-C4 yield, wt-% feed | 10.78 | 10.56 | 10.63 |
| C5 to 525° C. yield, wt-% feed | 67.70 | 67.07 | 68.80 |
| TIOR yield, wt-% | 3.19 | 3.33 | 3.16 |
| Mesophase yield, XRD, wt-% | 0.18 | 0.18 | 0.18 |

Performance of the alumina and iron oxide catalyst is comparable at all water contents. This performance indicates that water content does not impede the formation of iron sulfide from iron oxide.

Example 11

The alumina and iron containing catalysts were tested at varying larger particle diameters to assess the effect on performance for similar bauxite catalyst. The conditions of 455° C., 2000 psi (137.9 bar), a semi-continuous reactor with 6.5 sl/min of hydrogen and residence time of 80 minutes were constant for all the experiments. Iron content of catalyst in the SHC reactor was also constant at 0.7 wt-%. The mean particle diameter was determined using dry and wet methods with ASTM UOP856-07 by light scattering with a Microtrac S 3500 instrument. In the wet method, the weighed sample is slurried in a known amount of water and sonicated. An aliquot is put in the sample chamber for the light scattering measurement. In the dry method, a different sample holder is used and the particles are measured directly but also by light scattering. We believe the dry method gives diameters that more closely replicate the character of the catalyst that initially encounters the hydrocarbon feed. Mean particle diameter and performance comparisons are presented in Table VIII.

The alumina and iron oxide catalysts with mean particle diameters over 200 microns perform as well as the catalyst with mean particle diameters below 5 microns. Comparable performance was observed at mean particle diameters as high as 554 microns. We do not believe that water content affected performance comparisons because of our findings that water content does not substantially affect performance. Wet method particle determinations were dramatically smaller which may indicate that the method breaks the catalyst particles down to finer particles. This phenomenon may occur in the SHC reactor.

Example 12

Samples of bauxite with different particles sizes from Examples 10 and 11 were subjected to SHC at the same conditions as in Example 5 except at reactor temperatures of 455° C. The reactor temperature was 445° C. for iron sulfate. XRD was used to determine iron sulfide crystallite mean diameter based on the width of the iron sulfide peaks at 43 two theta degrees. Crystallite size was determined using the Debye-Scherrer formula for size broadening of diffraction peaks. Crystallite size and mesophase yield fraction are shown in Table IX.

TABLE VIII

| Sample | 523-77 | 523-83 | 523-84 | 523-88 | 523-89 | 523-87 | 523-90 | 523-100 |
|---|---|---|---|---|---|---|---|---|
| Dry mean particle diameter, microns | 4.9 | 4.9 | 4.9 | 249 | 258 | 299 | 481 | 554 |
| Dry median particle diameter, microns | 3.2 | 3.2 | 3.2 | 276 | 283 | 327 | 365 | 354 |
| Wet mean particle diameter, microns | 1.0 | 1.0 | 1.0 | 3.3 | 3.2 | 4.2 | 3.5 | 4.2 |
| Wet median particle diameter, microns | 1.2 | 1.2 | 1.2 | 2.6 | 2.7 | 2.9 | 2.7 | 3.3 |
| $Al_2O_3$, wt-% | 62.2 | 62.2 | 62.2 | 40.2 | 39.3 | 39.3 | 39.5 | 38.4 |
| $Fe_2O_3$, wt-% | 25.3 | 25.3 | 25.3 | 15.9 | 16.0 | 15.4 | 16.0 | 16.6 |
| BET surface area, $m^2/g$ | 159 | 159 | 159 | 246 | 237 | 235 | 237 | 235 |
| LOI | 7.6 | 7.6 | 7.6 | 37.5 | 36.9 | 38.4 | 36.1 | 38.3 |
| Pitch conversion, wt-% | 84.6 | 84.2 | 85.1 | 83.7 | 82.9 | 84.4 | 84.8 | 86.6 |
| $H_2S$, CO & $CO_2$ yield, wt-% | 4.2 | 4.4 | 4.3 | 4.2 | 4.2 | 4.2 | 4.3 | 3.1 |
| $C_1$-$C_4$ yield, wt-% | 10.4 | 10.9 | 10.6 | 10.6 | 10.5 | 10.8 | 10.9 | 7.9 |
| Naphtha ($C_5$-204° C.) yield, wt-% | 27.2 | 27.3 | 28.2 | 26.9 | 24.9 | 26.6 | 26.1 | 26.6 |
| LVGO (204° C.-343° C.) yield, wt-% | 24.8 | 24.3 | 24.4 | 25.2 | 24.1 | 24.5 | 25.2 | 26.1 |
| HVGO (343° C.-524° C.) yield, wt-% | 17.7 | 16.6 | 17.0 | 15.2 | 16.3 | 16.5 | 17.2 | 17.9 |
| Pitch (524° C.+) yield, wt-% | 13.9 | 14.1 | 13.5 | 14.5 | 15.2 | 13.9 | 13.6 | 11.9 |
| $C_5$-524° C. yield, wt-% | 70.0 | 68.3 | 69.9 | 67.3 | 65.4 | 67.6 | 68.5 | 70.6 |
| TIOR yield, wt-% | 3.7 | 3.9 | 3.1 | 2.7 | 4.0 | 3.2 | 2.7 | 2.9 |
| Mesophase yield, XRD, wt-% | 0.12 | 0.14 | 0.18 | 0.06 | 0.06 | 0.18 | 0.07 | 0.09 |

TABLE IX

| Sample | 523-77 | 523-83 | 523-88 | 523-100 | 523-89 | 523-87 | 523-93 | 523-104 (FeSO$_4$) |
|---|---|---|---|---|---|---|---|---|
| FeS crystallite mean diameter, nm | 10 | 11.5 | 11.5 | 12 | 12 | 11.5 | 9 | 26 |
| Mesophase yield fraction, XRD, wt-% | 0.12 | 0.14 | 0.06 | 0.09 | 0.06 | 0.18 | 0.18 | 0.79 |

The iron sulfide mean crystallite diameters from XRD for bauxite reside in a narrow nanometer range much lower than the smallest iron sulfide mean crystallite diameter for iron sulfate. After recycling the catalyst samples to the SHC once and twice, the iron sulfide crystallite sizes did not change substantially.

The invention claimed is:

1. A process for converting heavy hydrocarbon feed into lighter hydrocarbon products comprising:
   mixing said heavy hydrocarbon liquid feed with catalyst particles and hydrogen to form a heavy hydrocarbon slurry comprising hydrocarbon liquid and catalyst particles, said catalyst particles comprising about 2 to about 45 wt-% iron oxide and about 20 to about 98 wt-% alumina;
   hydrocracking hydrocarbons in said heavy hydrocarbon slurry in the presence of hydrogen and catalyst particles in a hydrocracking reactor to produce a hydrocracked slurry product comprising lighter hydrocarbon products, said reactor comprising no less than about 0.1 and no more than about 1.5 wt-% iron content based on the total weight of non-gas materials in the reactor; and
   withdrawing said hydrocracked slurry product from said hydrocracking reactor.

2. The process of claim 1 wherein the iron in the catalyst particles is no more than about 1.0 wt-% of the non-gas material in the reactor.

3. The process of claim 1 wherein the iron in the catalyst particles is no more than about 0.7 wt-% of the non-gas material in the reactor.

4. The process of claim 1 wherein the iron in the catalyst particles is no less than about 0.4 wt-% of the non-gas material in the reactor.

5. The process of claim 1 wherein more than about 80 wt-% of pitch material boiling above 524° C. in the heavy hydrocarbon liquid feed is converted to product having a boiling point temperature of no more than 524° C.

6. The process of claim 5 wherein more than about 82 wt-% of pitch material boiling above 524° C. in the heavy hydrocarbon liquid is converted to product having a boiling point temperature of no more than 524° C.

7. The process of claim 1 wherein no sulfur is added to the heavy hydrocarbon liquid feed.

8. The process of claim 1 wherein the yield of product boiling in the range of C$_5$ to 524° C. is greater than about 67 wt-%.

9. The process of claim 8 wherein the yield of product boiling in the range of C$_5$ to 524° C. is greater than about 70 wt-%.

10. The process of claim 1 wherein the yield of TIOR in the product is no more than about 3.0 wt-% of the feed.

11. The process of claim 1 wherein the yield of TIOR in the product is no more than about 2.8 wt-% of the feed.

12. The process of claim 1 wherein the catalyst particles comprise bauxite.

13. A process for converting heavy hydrocarbon feed into lighter hydrocarbon products comprising:
   mixing said heavy hydrocarbon liquid feed with catalyst particles and hydrogen to form a heavy hydrocarbon slurry, said catalyst particles comprising about 2 to about 45 wt-% iron oxide and about 20 to about 98 wt-% alumina;
   hydrocracking hydrocarbons in said heavy hydrocarbon slurry in the presence of hydrogen and catalyst particles in a hydrocracking reactor to produce a hydrocracked slurry product comprising lighter hydrocarbon products, said reactor comprising no less than about 0.1 and no more than about 1.57 wt-% iron based on the total weight of non-gas material in the reactor; and
   withdrawing said hydrocracked slurry product from said hydrocracking reactor.

14. The process of claim 13 wherein the iron in the catalyst particles is no less than about 0.4 wt-% of the non-gas material in the reactor.

15. The process of claim 13 wherein the iron in the catalyst particles is no more than about 0.7 wt-% of the non-gas material in the reactor.

16. The process of claim 13 wherein more than about 80 wt-% of pitch material boiling above 524° C. in the heavy hydrocarbon liquid is converted to product having a boiling point temperature of no more than 524° C.

17. The process of claim 13 wherein no sulfur is added to the heavy hydrocarbon liquid feed.

18. The process of claim 13 wherein the yield of product boiling in the range of C$_5$ to 524° C. is greater than about 67 wt-%.

19. A process for converting heavy hydrocarbon feed into lighter hydrocarbon products comprising:
   mixing said heavy hydrocarbon liquid feed with catalyst particles and hydrogen to form a heavy hydrocarbon slurry, said catalyst particles comprising bauxite;
   hydrocracking hydrocarbons in said heavy hydrocarbon slurry in the presence of hydrogen and catalyst particles in a hydrocracking reactor to produce a hydrocracked slurry product comprising lighter hydrocarbon products, said reactor comprising no less than about 0.1 and no more than about 0.7 wt-% iron based on the total weight of non-gas material in the reactor; and
   withdrawing said hydrocracked slurry product from said hydrocracking reactor.

* * * * *